US011725965B2

(12) United States Patent
Calbris et al.

(10) Patent No.: US 11,725,965 B2
(45) Date of Patent: Aug. 15, 2023

(54) METHOD AND DEVICE FOR RECONSTRUCTING A BACKSCATTERED ELECTROMAGNETIC VECTOR WAVE

(71) Applicant: Febus Optics, Pau (FR)

(72) Inventors: Gaëtan Calbris, Jurançon (FR); Vincent Lanticq, Casteide-Doat (FR); Etienne Almoric, Wissous (FR)

(73) Assignee: Febus Optics, Pau (FR)

( * ) Notice: Subject to any disclaimer, the term of this patent is extended or adjusted under 35 U.S.C. 154(b) by 0 days.

(21) Appl. No.: 17/628,944

(22) PCT Filed: Jul. 26, 2020

(86) PCT No.: PCT/HR2020/051368
§ 371 (c)(1),
(2) Date: Jan. 21, 2022

(87) PCT Pub. No.: WO2021/019171
PCT Pub. Date: Feb. 4, 2021

(65) Prior Publication Data
US 2022/0252435 A1 Aug. 11, 2022

(30) Foreign Application Priority Data
Jul. 26, 2019 (FR) ...................................... 1908568

(51) Int. Cl.
G01D 5/353 (2006.01)
G01H 9/00 (2006.01)
(52) U.S. Cl.
CPC ......... *G01D 5/35361* (2013.01); *G01D 5/353* (2013.01); *G01D 5/35358* (2013.01); *G01H 9/004* (2013.01)

(58) Field of Classification Search
CPC ............... G01D 5/35361; G01D 5/353; G01D 5/35358; G01D 21/02; G01H 9/004; H04B 10/25
See application file for complete search history.

(56) References Cited

U.S. PATENT DOCUMENTS 9,009,003 B1 4/2015 Chan et al.
9,628,314 B1 * 4/2017 Mellick ............... H04L 27/2275
(Continued)

FOREIGN PATENT DOCUMENTS

| WO | 2010045286 A1 | 4/2010 |
| WO | 2012030814 A2 | 3/2012 |
| WO | 2013066654 A1 | 5/2013 |

OTHER PUBLICATIONS

Pan, et al. "Phase-sensitive OTDR system based on digital coherent detection." Proc. SPIE-OSA-IEEE, vol. 8311.83110S, 2011. 6 pages.
(Continued)

*Primary Examiner* — Dominic J Bologna
(74) *Attorney, Agent, or Firm* — Pearne & Gordon LLP

(57) ABSTRACT

Disclosed is a method for reconstructing an electromagnetic vector wave backscattered in all or part of an optical fiber. According to an embodiment of the method a light signal of a frequency $v_0$ or $v_0+v_A$ is injected into the optical fiber. A step of polarization-resolved heterodyne optical detection includes the generation of at least two orthogonally polarized backscattered light signals, producing a beat preferably of a frequency $v_A$. At least one photodetector converts the orthogonally polarized backscattered light signals into initial analog signals. Electrical homodyne detection is performed by an IQ demodulator so as to generate I and Q demodulated analog signals. A processing module reconstructs the electromagnetic vector wave backscattered in all or part of the optical fiber.

16 Claims, 13 Drawing Sheets

(56) References Cited

U.S. PATENT DOCUMENTS

2010/0092176 A1* 4/2010 Hartog .................. H04B 10/61
398/205
2010/0128279 A1* 5/2010 Cho ..................... G01B 9/0207
356/484

OTHER PUBLICATIONS

International Search Report & Written Opinion in PCT/FR2020/051368 dated Oct. 23, 2020, 7 pages.
Tu, Goujie, et al. "A phase-sensitive optical time-domain reflectometry system with an electrical I/Q demodulator." Proc. of SPIE, vol. 10821, pp. 1082123-1 to 1082123-7. Oct. 2018.

* cited by examiner

METHOD AND DEVICE FOR RECONSTRUCTING A BACKSCATTERED ELECTROMAGNETIC VECTOR WAVE

The invention is concerned with the field of distributed fiber optic measurements, and more particularly with the reconstruction of a backscattered electromagnetic vector wave. The invention relates to a method for reconstructing an electromagnetic vector wave backscattered in all or part of an optical fiber. The invention further relates to a device for reconstructing a backscattered electromagnetic vector wave. The invention also relates to an optoelectronic measurement method using a reconstructed backscattered electromagnetic vector wave according to the invention.

PRIOR ART

Distributed fiber optic sensors are used to measure environmental influences such as pressure, temperature, mechanical motion and vibration in a variety of applications including monitoring conditions in oil, gas and other wells, monitoring structures such as pipelines, buildings and bridges, acoustic monitoring for perimeter security and seismic acquisition. These monitoring techniques use, for example, distributed fiber optic measurements.

The basic principle of distributed fiber optic measurements is to launch a pulse of laser light into one end of the optical fiber and then collect the backscattered light returning from the optical fiber. The backscattered light is collected and analyzed in order to correlate the characteristics of the collected backscattered light (light intensity, wavelength, phase . . . ) to a physical phenomenon applied to the optical fiber and the travel time of the collected backscattered light to the position of the physical phenomenon.

However, in the optical fiber distributed detection systems, there is attenuation or even fading of the signal (called "Fading" in Anglo-Saxon terminology) leading to a loss of information and inability to analyze the measurement.

Fading is a consequence of the interference due to the wave phenomenon of electromagnetic waves constituting the laser pulse and the addition of backscattered electromagnetic waves of a same wavelength and coherent with each other (that is to say with a constant phase relationship). The fading phenomenon depends on the wavelength (or optical frequency), the phase and the polarization. This results in a random distribution of strong signal (constructive interference) and weak signal (destructive interference) areas along the optical fiber.

The quality of the extraction of a phase value will then depend on the attenuation or fading of the signal in the optical fiber. Indeed, the weak signal areas will make the extraction of the phase and thus the analysis of environmental influences more complex.

Techniques based on frequency or phase diversity have been developed to mitigate the fading effect and improve the quality of the phase measurement.

For example, a method illustrated in document WO2013/066654 based on a coherent detection OTDR system can be used to extract phase information from a backscatter signal. This method involves several interrogation pulses of different frequencies launched into the optical fiber and requires a heterodyne detection system. However, the implementation of several interrogation pulses of different frequencies leads to the interrogation and detection scheme becoming more complex and it also requires the application of a selectivity criterion.

Another method disclosed in the document "Phase-sensitive OTDR system based on digital coherent detection", Pan et al., Asia Communication and Photonics, Vol. 8311.83110S, 2011 relies on partially changing the phase of every other pulse. The heterodyne detection is not modified compared to a classical heterodyne detection, but the pulses of different phases must be processed independently, which increases the time and difficulty of the analysis of the backscattered signal. In addition, the noise from the laser source becomes an overwhelming noise factor for measuring the phase. Thus, the noise source is too large to measure the phase accurately and reliably.

Another approach outlined in document U.S. Pat. No. 9,009,003 is to diversify the polarization detection into either a two orthogonal polarization scheme or three polarizations at 60° from each other. The different polarizations can be processed independently and a selectivity criterion is applied, or combined. In the first case, the information is always partial. In the second case, the total amplitude is recovered, and the fading effect induced by polarization is suppressed, but the phase information is lost through the calculation of the amplitude.

Another method illustrated in document WO2010/045286 consisting of polarization-resolved optical heterodyne detection has been developed as illustrated in FIG. 1. To this end, a light signal from a light source 101 at a frequency $v_0$ is sent to an optical coupler 102. The light signal is split into two distinct paths, to a local oscillator 107 of a frequency $v_0$ and to an optical fiber 106 to be tested. On this path, the optical power is increased and controlled using an optical amplifier 103. An acousto-optic modulator 104 then generates a pulse train of defined duration and repetition rate. The optical frequency is thus shifted by a value equal to the selected heterodyne frequency. The pulse train thus generated and amplified is sent into the fiber 106 via an optical circulator 105. The electromagnetic wave backscattered by the Rayleigh-type fiber 106 to be tested is recovered using the same optical circulator 105 and guided to a polarization coupler/splitter 108. It is mixed with the electromagnetic wave from the local oscillator 107 and separated into two orthogonal polarizations 109 and 110. The resulting mix contains a spectral component at the heterodyne frequency, the amplitude and phase of which depend on those of the backscattered wave. Photodetectors 111 then convert the electromagnetic information into electrical information. The electrical signal thus obtained can be sent directly to an analog/digital conversion and acquisition system 112 to digitally extract the amplitude and phase information of the heterodyne component therefrom. However, this requires strong sampling, in order to sufficiently resolve the signal at the heterodyne frequency, as well as sufficient computing power for digital phase extraction. In addition, using the coupler to recombine the local oscillator signal and the backscattered signal implies a loss of half of the signal and thus a decrease in the quality of the extraction. The use of a polarization splitter for a polarization-resolved quantitative measurement implies that the local oscillator is a linear polarization at 45° to the axes of the polarization splitter. This polarization must be selected and remain stable over time, which is a disadvantage for the quality of the measurements. An analog amplitude and phase extraction system can also be used between the photodetectors and the acquisition system to avoid digital extraction. Although based on a polarization-resolved optical heterodyne detection, the presented method does not allow to trace the complete parameters of the wave, that is to say the spatial and time behavior of the electric field of the wave backscattered by an optical fiber. Also, the use of the information collected by the device is not used to reduce or eliminate the fading effect.

Thus, there is a need for new methods or devices for optimizing the extraction of the properties of a backscattered electromagnetic wave while decreasing the fading effect, thus allowing to fully use the information of the backscattered electromagnetic wave.

Technical Problem

The invention therefore aims to overcome the disadvantages of the prior art. In particular, the purpose of the invention is to propose a method for reconstructing a backscattered electromagnetic vector wave, said method being simple, and allowing access to the total electromagnetic wave and optimization of the extraction of its properties while reducing the fading effect. The method also allows to identify a variation of one or more external parameters acting on the behavior of the electromagnetic wave.

The invention further aims to propose a device for reconstructing an electromagnetic vector wave backscattered in all or part of an optical fiber, said device making it possible to fully reconstruct a backscattered electromagnetic vector wave and to access all the properties that characterize it, while in particular making it possible to mitigate the fading phenomenon.

BRIEF DESCRIPTION OF THE INVENTION

To this end, the invention relates to a method for reconstructing an electromagnetic vector wave backscattered in all or part of an optical fiber, said method comprising:

A step of injecting into the optical fiber a light signal of a frequency $v_0$ or $v_0+v_A$, A step of polarization-resolved heterodyne optical detection including the generation, by an optical separation means and from a backscatter of the injected light signal and an electromagnetic wave from a local oscillator, of at least two orthogonally polarized backscattered light signals, producing a beat preferably of a frequency $v_A$, A step of converting, by at least one, preferably at least two photodetectors, the orthogonally polarized backscattered light signals into initial analog signals, A step of electrical homodyne detection, by an IQ demodulator, for IQ demodulating each of the initial analog signals, so as to generate I and Q demodulated analog signals for each of the orthogonally polarized backscattered light signals, and A step of reconstructing, by a processing module, the electromagnetic vector wave backscattered in all or part of the optical fiber from the I and Q demodulated analog signals generated.

Such a method allows the reconstruction of a backscattered electromagnetic vector wave and thus gives a complete, simultaneous and real-time access to the properties that characterize it (amplitude, phase, state and degrees of polarization, vector dynamics). The characteristics of such a backscattered electromagnetic vector wave can then be analyzed to better characterize its propagation medium, that is to say variations in index, optical path, birefringence, polarization modal dispersion, and this in a manner distributed in all or part of the optical fiber. In addition, such a method mitigates the fading phenomenon. The method also facilitates the analysis of distributed fiber optic measurements and has the advantage of being inexpensive. In addition, no selectivity criteria are applied, the phase information is retained and can be used.

Thus, the method allows for accurate reconstruction and analysis without the need for strong sampling or high computing power.

The use of an identical local oscillator for optical heterodyne detection and an identical reference signal for electrical IQ demodulation allows the two orthogonal polarizations to be processed in a time-synchronized, parallel and combined manner. Their relationship is in every way preserved.

According to other optional features of the method:

it comprises a step of shifting the phase of a portion of the backscattered light signals, a portion of the initial analog signals or an analog reference signal at the frequency $v_A$. This reduces noise and improves the quality of measurements. In addition, this allows access to the complex amplitude or phase and amplitude.

the electrical homodyne detection step comprises a demodulation at the frequency $v_A$ by the IQ demodulator. The electrical homodyne detection allows IQ-type demodulation. IQ electrical demodulation at the frequency $v_A$ reduces noise and improves measurement quality while directly accessing the complex amplitude of the demodulated signals and acquiring them at a reduced sampling rate.

it comprises a step of calculating the complex amplitude from the I and Q demodulated analog signals generated.

the step of reconstructing the backscattered electromagnetic vector wave comprises a step of calculating the phase and/or amplitude in all or part of the optical fiber and for any projection axis in all or part of the optical fiber as a function of the complex amplitude values determined from the I and Q demodulated analog signals generated. Performing this calculation substep then gives the ability to quickly reconstruct the backscattered electromagnetic vector wave.

it comprises a step of calculating phase and amplitude values from the I and Q demodulated analog signals generated.

the step of reconstructing the backscattered electromagnetic vector wave comprises a step of calculating the complex amplitude in all or part of the optical fiber and for any projection axis in all or part of the optical fiber as a function of the amplitude and phase values calculated from the I and Q demodulated analog signals generated.

it comprises calculating a maximum amplitude comprising identifying an optimal angle associated with the maximum amplitude for any projection axis in all or part of the optical fiber, said optimal angle corresponding to the angle having the highest maximum amplitude among amplitudes of a plurality of angles corresponding to the projection axes in all or part of the optical fiber. Performing this calculation substep then gives the ability to quickly reconstruct the backscattered electromagnetic vector wave. In addition, this allows access to one or more parameters of interest of the backscattered electromagnetic vector wave.

it comprises a step of detecting a parameter of interest, preferably of the backscattered electromagnetic vector wave. This allows the characterization of the backscattered electromagnetic vector wave. In addition, this also allows the characterization of the environmental influences that can be exerted on the optical fiber.

the step of reconstructing the backscattered electromagnetic vector wave comprises a step of calculating, at a plurality of points of all or part of the optical fiber, the amplitude of the signal for a plurality of angles. This allows access to the maximum amplitude of the signal at a plurality of points of the optical fiber, the maximum amplitude allowing access to information that is little or not affected by fading phenomena. More generally, such a step allows access to the polarization state.

it comprises a step of identifying a main optical axis of the light signal backscattered in all or part of the optical fiber from a calculation of a maximum amplitude, preferably of the amplitude of the signal calculated for a plurality of angles. This allows access to the main optical axis and thus reduces the fading effect. Indeed, the main optical axis of the light signal backscattered in all or part of the optical fiber corresponds to the axes allowing a maximum amplitude of the signal for a plurality of points of all or part of the optical fiber. By projecting the complex amplitude onto the main axis, the polarization-induced fading effect is suppressed while preserving the phase information.

it comprises a step of modulating the light signal by a modulator, before the step of injecting into the optical fiber, said modulation allowing a shift in the frequency of the light signal by a value equal to $v_A$. This makes it possible to differentiate the different signals from the backscatter or the local oscillator.

it comprises a step of intermediate amplification of the electrical signal from the modulator at the modulation frequency $v_A$, for example by an amplifier. This improves the sensitivity of the result.

it comprises a step of analog filtering, for example by at least one low-pass filter, making it possible to suppress the frequencies of the analog signals higher than a predetermined threshold. This reduces the noise around the frequency $v_A$.

According to another aspect, the invention relates to a method of optoelectronic measurement in a distributed acoustic detection system comprising reconstructing an electromagnetic vector wave backscattered in all or part of an optical fiber according to the invention and measuring a deformation and/or a temperature variation in all or part of the optical fiber as a function of the reconstructed backscattered electromagnetic vector wave. This allows access to information related to the environmental influences of the fiber in various ways. Indeed, thanks to the invention, any stress, deformation or variation of temperature but also of pressure for example can be detected and analyzed.

According to other optional features of the method, it comprises measuring a deformation and/or a temperature variation in all or part of the optical fiber on a preferably reconstructed main optical axis.

According to another aspect, the invention relates to a device for reconstructing an electromagnetic vector wave backscattered in all or part of an optical fiber, said device comprising:

A light source configured to generate a light signal of a frequency $v_0$, suitable for injection into the optical fiber, An optical separation means configured to generate at least two orthogonally polarized backscattered light signals, producing a beat preferably of a frequency $v_A$, from a backscatter of the injected light signal and an electromagnetic wave from a local oscillator, At least one, preferably at least two photodetectors, configured to convert the orthogonally polarized backscattered light signals into initial analog signals, An IQ demodulator arranged to perform an electrical homodyne detection, for IQ demodulating each of the initial analog signals so as to generate I and Q demodulated analog signals for each of the orthogonally polarized backscattered light signals, and A processing module configured to reconstruct the electromagnetic vector wave backscattered in all or part of the optical fiber from the I and Q demodulated analog signals generated.

Such a device according to the invention allows a complete reconstruction of the electromagnetic wave backscattered in an optical fiber when a pulse is injected thereinto. The optical separation means is advantageously configured to perform polarization-resolved heterodyne optical detection. The device for reconstructing an electromagnetic wave simultaneously extracts the complex amplitude or the amplitude and phase for two orthogonal polarizations of the backscattered electromagnetic wave. Access to the electromagnetic vector wave allows to have all its characteristics and thus opens up ways of analysis of the backscattered signal until now inaccessible. In particular, by reconstructing the backscattered electromagnetic wave, the fading effect induced by the polarization can be totally suppressed and above all the phase information is preserved, thus allowing to use it. The complex amplitudes acquired by the device containing the amplitude and phase information of the two orthogonal polarizations acquired by the device are combined and not processed separately to provide phase and amplitude information of the wave where the polarization-induced fading effect is suppressed. Thus, no selectivity criteria are imposed, the mitigation of the fading phenomenon is entirely based on the physical properties of the electromagnetic wave guided in the optical fiber. In addition, the device has the advantage of being less complex than systems which use optical frequency diversity to mitigate the fading effect.

Other advantages and features of the invention will appear upon reading the following description given by way of illustrative and non-limiting example, with reference to the appended figures.

Figure 1:
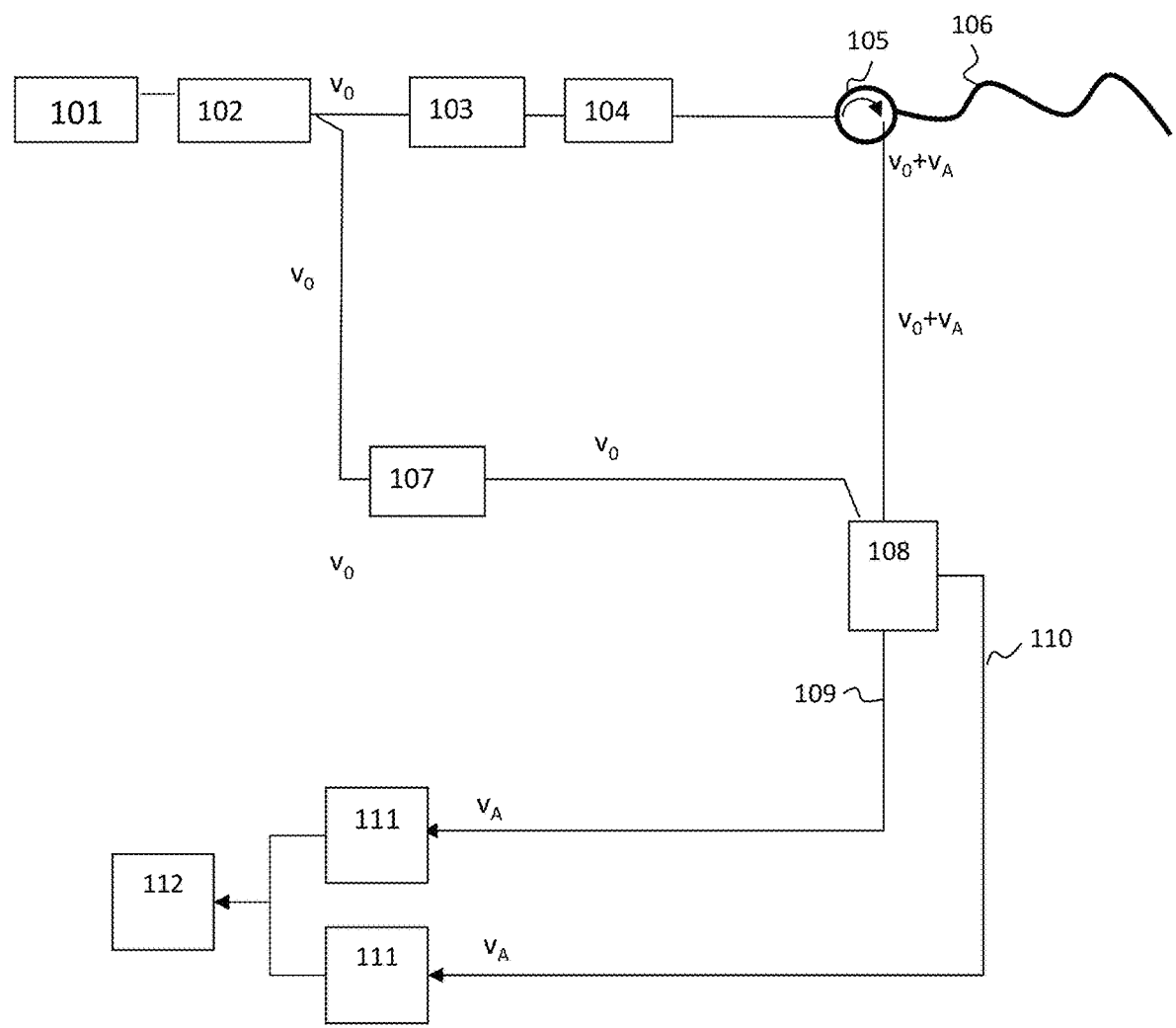
FIG. 1 shows a diagram of a prior art device of a distributed measurement system based on Rayleigh backscattering using polarization-resolved heterodyne optical detection and digital amplitude and phase analysis.

Aspects of the present invention shall be described with reference to flowcharts and/or block diagrams of methods, apparatus (systems) according to embodiments of the invention.

In the figures, the flowcharts and block diagrams show the architecture, the functionality and the operation of possible implementations of systems, methods according to various embodiments of the present invention. In this respect, each block in the flowcharts or block diagrams may show a system, device, module, or code, which comprises one or more executable instructions for implementing the one or more specified logical functions. In some implementations, the functions associated with the blocks may appear in a different order than that shown in the figures. For example, two blocks shown in succession may, in fact, be executed substantially simultaneously, or the blocks may sometimes be executed in reverse order, depending on the functionality involved. Each block in the flow diagrams and/or flowchart, and combinations of blocks in the flow diagrams and/or flowchart, may be implemented by special hardware systems that perform the specified functions or acts or perform combinations of special hardware and computer instructions.

Furthermore, the dotted blocks correspond to optional steps.

DESCRIPTION OF THE INVENTION

In the following description, the expression "backscattered electromagnetic vector wave", within the meaning of the invention, corresponds to the electromagnetic wave backscattered by a material in which it propagates such as an optical fiber defined by the spatial and time behavior of its electric field (its spatial orientation, its amplitude and its phase).

The term "reconstruction", within the meaning of the invention, corresponds to the calculation of the amplitude and phase characteristics of the backscattered electromagnetic vector wave whatever the polarization axis and preferably for any polarization axis.

By "in all or in part" is meant, within the meaning of the invention, a portion of the optical fiber or the entire optical fiber. Thus, in the context of distributed measurements, these can be distributed along the entire optical fiber or on one or more portions of the optical fiber, but it can also be a measurement distributed over a plurality of points within the optical fiber. Preferably, it is not a one-time measurement.

By "light signal" is meant, within the meaning of the invention, an electromagnetic wave of fixed or variable frequency, of fixed or variable intensity, free or guided. Preferably, it is a signal guided in an optical fiber.

The term "injection", within the meaning of the invention, corresponds to the introduction of a light signal into an optical fiber, for example.

The term "backscattered" or "backscatter", within the meaning of the invention, corresponds to the fraction of the incident wave that is returned in the direction of emission of the incident wave. It is a back scattering of a particle, a deflection of the radiation due to the scattering by the material at angles greater than 90° with respect to their direction of emission.

By "orthogonally polarized light signals" is meant, within the meaning of the invention, light signals for which the scalar product of the two JONES vectors representing the polarization state of these light signals is equal to zero, in other words, light signals, the polarization state of which represented by two vectors E1 and E2, respectively, are orthogonally polarized if E1*.E2=0, where * is the conjugate transpose operator.

The expression "analog signal", within the meaning of the invention, corresponds to a signal having a physical quantity and varying continuously. For example, when converting an optical signal into an electrical signal, said electrical signal is then an analog signal.

By "digital signal" is meant in particular, within the meaning of the invention, a set of physical quantities or data represented by means of encrypted characters, by means of which the information is represented by a finite number of well-defined discrete values that one of its characteristics can have over time.

By "a portion of the signal" is meant a fraction of the entire signal, for example half of the signal.

The expression "homodyne detection", within the meaning of the invention, corresponds to a detection allowing characteristics to be extracted such as the amplitude and the phase of a signal oscillating at a certain frequency compared to a reference oscillation of a same frequency. The comparison is usually done by multiplication with a local oscillator having a shape identical to the shape of the oscillating signal. The signal is thus brought in baseband (zero frequency). In general, homodyne corresponds to a single frequency as opposed to double frequencies (heterodyne detection).

The expression "heterodyne detection", within the meaning of the invention, corresponds to a detection based on the mixing of the backscattered light signal with a reference light signal, for example the light signal of a local oscillator. Heterodyne detection allows to shift the frequency spectrum composing a signal. Heterodyne detection allows, for example, to reduce a high frequency signal to a lower frequency. To bring a signal to a lower frequency, this signal can be mixed with a known signal of a local oscillator, the frequency obtained is then the difference between the local oscillator and the signal studied.

By "modulation" is meant, within the meaning of the invention, the action of varying a signal in order to modify its amplitude, its phase, its frequency over time.

The term "demodulation", within the meaning of the invention, corresponds to a method of analysis of an initial signal allowing the separation of a signal of interest from the oscillation it modulates. A demodulation is said to be "IQ type" when it includes an in-phase demodulation and a phase quadrature demodulation.

The expression "complex amplitude", within the meaning of the invention, corresponds to the amplitude of a signal as composed of a real part and an imaginary part.

The expression "real and imaginary part", within the meaning of the invention, corresponds to each part of a complex signal. It is a representation in a complex plane, where the real part is projected on the real axis and the imaginary part on the imaginary axis, the argument corresponding to the phase and the module to the amplitude. The use of a complex signal allows to simplify the calculations.

By "phase shift" is meant the phase difference at the origin of the signals studied. The phase shift is generally between π and −π and assimilated to a delay of the variation of a signal compared to another, at the same frequency.

The expression "multiplied in phase", within the meaning of the invention, corresponds to the mixing of the signal from a modulator with the analog signal.

The expression "multiplied in phase quadrature", within the meaning of the invention, corresponds, in opposition to "multiplied in phase", to the mixing of the signal from a modulator with the analog signal, the phase ratio between the two being only shifted by 90° or pi/2 radian with respect to the "multiplication in phase".

The expression "predetermined threshold", within the meaning of the invention, corresponds to a specific value above or below which the frequencies are filtered. This is a limit value and generally corresponds to a frequency value beyond which a maximum of noise is removed while preserving the signal of interest.

By "stress" is meant, within the meaning of the invention, a force applied to a material or body. This force may be exerted by torsion, traction, thrust, or any other force resulting in "deformation" or displacement of the material or body on which it is exerted.

The term "deformation", within the meaning of the invention, corresponds to a change in the shape or dimension of a material or body without exceeding the breaking point of the material or body in question. For example, a deformation, within the meaning of the invention, tends to stretch or compress a material or body undergoing a force and in particular in the form of a stress.

The expression "main optical axis", within the meaning of the invention, corresponds to the optical axis on which the amplitude of the projection of the electromagnetic wave is maximum inside an optical fiber. The main axis is the one on which the signal has a maximum amplitude, that is to say greater than all the other signal amplitudes on a same segment of an optical fiber. It is the main axis of the ellipse formed by the electric field of the electromagnetic wave at a given position of the fiber, the ellipse defining the polarization state of the electromagnetic wave. Thus, within the meaning of the invention, the main optical axis varies along the optical fiber to always correspond to the axis on which the signal, at that point of the optical fiber, will have a maximum amplitude.

The expression "projection axis", within the meaning of the invention, corresponds to the axis on which the electric field will oscillate, that is to say, where it is possible to observe the electric field oscillating.

By "polarization state" is meant, within the meaning of the invention, the shape defined by the movement of the orientation of the electric field in the sectional plane perpendicular to the propagation of the electromagnetic wave. The polarization state can be straight, ellipsoidal or circular.

By "detection of a parameter" or by "parameters of interest" is meant, within the meaning of the invention, one or more characteristics of the backscattered electromagnetic vector wave such as amplitude, phase, state and degrees of polarization, vector dynamics, variations in index, optical path, birefringence, polarization modal dispersion.

By "coupled" is meant, within the meaning of the invention, mixing, for example, adding or multiplying two signals together.

In the following description, the same references are used to designate the same elements.

Various optical effects are known during a fiber optic measurement, including Brillouin, Raman and Rayleigh backscattering, and each of these techniques has different characteristics allowing the determination of different environmental influences, at different time scales. The environmental parameters of the optical fiber that can be measured using a backscatter-based fiber optic distributed measurement technique are related to the behaviors of the backscattered electromagnetic vector wave. Furthermore, the environmental parameters of the optical fiber currently measurable using a distributed fiber optic measurement technique based on Rayleigh backscattering are directly and linearly related to the phase of the backscattered electromagnetic wave. Thus, to quantitatively determine an environmental influence based on Rayleigh backscattering, the quality of the measurement depends directly on the ability to correctly extract the phase of the backscattered electromagnetic wave.

Currently, the study of environmental influences by distributed fiber optic measurement is limited by the fading phenomenon. The fading phenomenon makes the extraction of the phase more complex, thus the quality of the measurements and by extension the study of environmental influences.

The inventors have therefore developed a method and a device for reconstructing an electromagnetic vector wave; where the reconstruction of the backscattered electromagnetic vector wave makes it possible to suppress the polarization-induced fading effect.

The invention will be described in the context of Rayleigh-type backscattering in an optical fiber, but it is not limited to an optical fiber and can be implemented by any means capable of guiding a light wave.

Figure 2:
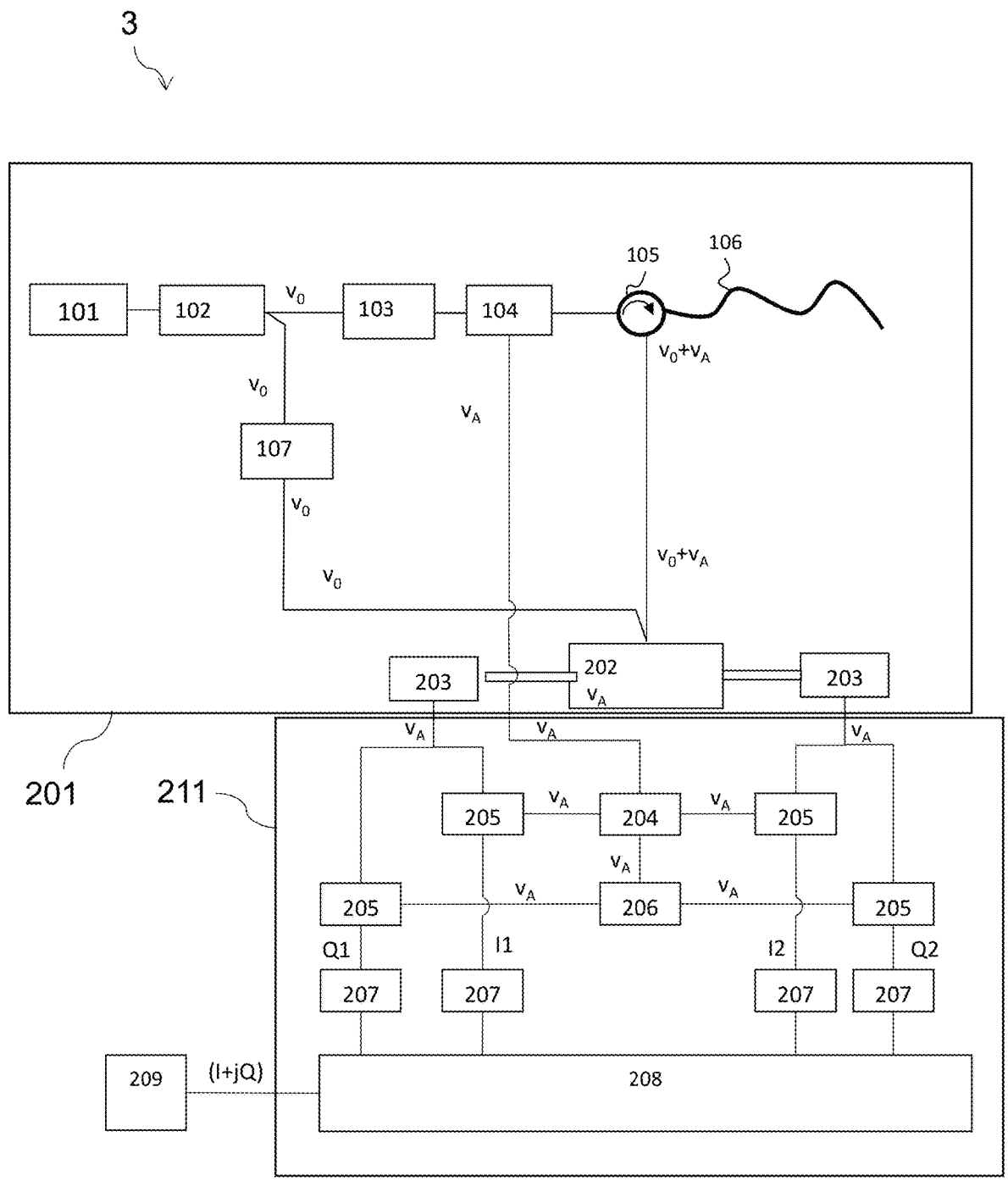
FIG. 2 shows a diagram of a device according to an embodiment of the invention.

FIG. 2 schematically shows a device 3 for reconstructing an electromagnetic vector wave backscattered in all or part of an optical fiber 106.

In particular, the backscattered electromagnetic vector wave can be reconstructed from a backscattered light signal in an optical fiber 106.

Furthermore, the backscattered light signal can preferably correspond to a Rayleigh type backscatter signal.

An optical fiber 106 according to the invention may correspond to any type of optical fiber configured to propagate and guide a light signal. Preferably, an optical fiber according to the invention is a silica telecommunication optical fiber. Advantageously, an optical fiber made of silica reduces the losses during the propagation of the light wave in the optical fiber. Optionally, an optical fiber 106 can correspond to a modified fiber to increase the backscattering process. For example, "enhanced" fibers can be used. These fibers have the particularity of an increased backscattering by increasing the impurities in the fiber or by the inscription of Bragg gratings within them in order to increase the light reflection.

A reconstruction device 3 according to the invention may comprise a light source 101. The light source 101 is configured to generate a light signal. The light signal has, for example, a frequency $v_0$. The light signal is suitable for injection into the optical fiber 106.

A light source 101 can be a continuous optical source with a single optical pulse or a discontinuous source with several optical pulses (also called "pulse" in Anglo-Saxon terminology). Preferably, the light source is continuous.

A light source 101 according to the invention can be a narrow band source such as a distributed feedback fiber laser (which generally provides the narrowest possible laser spectrum for which the emission wavelength can be selected over a wide range), a DFB (for "Distributed FeedBack" in Anglo-Saxon terminology) laser using a Bragg grating, or an external cavity laser (ECL for External Cavity Laser). The emission wavelength $\lambda_0$ is preferably equal or substantially equal to 1550 nm, at the corresponding frequency $v_0$. The line of the emitted light wave is centered on the emission wavelength $\lambda_0$ and it has a large coherence length.

The light source 101, for example a laser, emits a moderately powerful light signal, typically of the order of 20 mW, in an optical fiber 106.

The light source 101 emits a light signal with a linear polarization state.

Optionally, a device for making the polarization state linear can be used.

A reconstruction device 3 according to the invention may include an optical coupler 102, preferably a polarization-maintaining optical coupler 102. A polarization-maintaining coupler 102 is configured to split the light signal from the light source 101 into two signals of identical frequency distributed in two arms. The first arm directs a portion of the light signal at the frequency $v_0$ to a local oscillator 107. The local oscillator is composed of a polarization-maintaining fiber. The second arm directs the other portion of the light signal at the frequency $v_0$ to the optical fiber 106 while preserving the initial polarization state from the light source 101.

Advantageously, the use of a polarization-maintaining coupler 102 and a polarization-maintaining fiber on the local oscillator maintains the outgoing polarization of the light source. The polarization stability of the local oscillator is improved. The latter is used as a reference, especially during polarization separation, and its stability is crucial for the quality of the signal.

A coupler 102 can correspond to a connector, mirror, lens, optical fiber assembly (for example based on the fusion of a section of two optical fibers) allowing the orientation of the light signal in a desired direction. This can be any means, preferably optical, configured to split and direct the light signal while preserving its polarization state.

A reconstruction device 3 according to the invention may comprise an optical amplifier 103. The amplifier is configured to amplify the signal. In particular, it is configured to increase and control the signal strength.

A reconstruction device 3 according to the invention may comprise an optical modulator 104. The modulator is preferably an acousto-optic modulator. Preferably, the optical modulator can be arranged downstream of the optical amplifier. The modulator is configured to generate a pulse train of predetermined duration and repetition rate. Multiple optical pulses may be transmitted in the optical fiber 106, where the multiple optical pulses can be sent simultaneously or at different times. The multiple optical pulses can have different frequencies, polarizations and durations.

The frequency $v_0$ is shifted relative to the light signal from the light source 101 by an amount equal to, or an integer multiple of, the predetermined frequency value of the modulator. In addition, the frequency $v_0$ can also be shifted relative to the light signal from the light source 101 by a value equal to $-v_A$. Preferably, the frequency value of the modulator 104 corresponds to a frequency value equal to $v_A$. Thus, as shown in FIG. 2, a frequency $v_A$ is provided as a result of a control signal for the modulator 104. The pulse can be triggered by a subunit controlling a trigger pulse. The optical pulse thus extracted from the modulator 104 is thus also shifted in frequency relative to the input of the light signal to the modulator 104 from the light source 101, and also relative to the local oscillator signal in the first arm.

The modulator 104 is preferably capable of imposing a frequency shift of at least 10 MHz on the continuous signal and transforming it into a pulse signal to be injected into an optical fiber. The signal from the modulator has a continuous component of a frequency $v_0$, transformed into a pulse component of a frequency $v_0+v_A$. The modulator 104 is capable of generating a pulse signal having a frequency shifted from the frequency of the continuous light signal. The frequency shift $v_A$ applied to said shifted frequency may be greater than or equal to 10 MHz. The frequency $v_A$ is the natural frequency of the modulator and is generally greater than or equal to 10 MHz and less than or equal to 1 GHz, preferably substantially equal to 200 MHz. The time width of the pulse thus generated may for example be between 10 ns and 500 ns, preferably it is substantially equal to 20 ns.

Alternatively, the frequency shift may be implemented in the path of the local oscillator 107.

Other pulse creation and frequency shifting mechanisms can be used, such as electro-optical modulators or a combination of electro-optical and electro-acoustic modulators. The frequency shift, while not strictly necessary, is convenient in that it also allows the signals resulting from the combination of the reflected and local oscillator signals to be distinguished from light coming only from the local oscillator path or the backscattered signal.

This also allows the relative optical phase of various signals to be measured appropriately in the electrical domain.

Optionally, a trigger may be implemented to determine when the next pulse should be generated by the modulator 104. The optical modulator 104 thus reduces the effects of intra-pulse interference and thus noise. This feature is particularly advantageous when monitoring Rayleigh backscattering is desired.

Advantageously, at the output of the modulator 104, the light signal, preferably of a frequency $v_0+v_A$ is directed to a circulator.

Preferably, an electrical signal of a frequency $v_A$ is also injected, preferably continuously, into the modulator and directed to an amplifier 204. This signal can be used as a reference to the frequency $v_A$.

A reconstruction device 3 according to the invention may comprise an optical circulator 105. Preferably, the optical circulator 105 is arranged downstream of the modulator 104. The optical circulator 105 is configured to receive the light signal, for example from the coupler 102, the modulator 104 or the amplifier 103, preferably at a frequency equal to $v_0+v_A$. In addition, the optical circulator 105 is configured to inject the light signal into the optical fiber 106. Finally, the optical circulator 105 is configured to collect backscatter, for example Rayleigh backscatter, from the optical fiber 106. Indeed, the signal at a frequency $v_0$ or $v_0+v_A$ is injected into the optical fiber, which generates in the opposite direction, a backscatter signal (for example Rayleigh) in response to the pulse. The Rayleigh backscatter signal has a frequency $v_0$ or $v_0+v_A$. The backscatter signal is separated from the forward light to be directed to an optical separation means 202, 303.

Thus, a reconstruction device 3 according to the invention comprises an optical coupling/separation means 202. The optical coupling/separation means 202 is preferably configured to couple the electromagnetic wave from the local oscillator 107 at a frequency $v_0+v_A$ or $v_0$ with the Rayleigh backscatter signal from the optical fiber at a frequency $v_0$ or $v_0+v_A$. The optical coupling/separation means 202 is also configured to generate at least two backscattered light signals of orthogonal polarizations from a backscatter of the injected light signal. Said at least two backscattered light signals of orthogonal polarizations have for example a frequency at $v_0+v_A$, preferably a beat at a frequency $v_A$.

Since the frequencies from the local oscillator 107 and the Rayleigh backscatter signal are different, a reconstruction device 3 according to the invention comprises a polarization-resolved heterodyne optical detection 201.

An optical coupling/separation means 202 may correspond to a splitter coupler, a polarization splitter coupler, a 90° hybridizer, a 180° hybridizer. Preferably, in this embodiment, the optical coupling/separation means may correspond to a 180° hybridizer. The polarization of the local oscillator is maintained and fixed at 45° with respect to the axes of the polarization splitter allowing polarization resolution in a quantitative way.

In another embodiment, the optical backscatter signal is first combined with the light signal from the local oscillator 107 to form a combined signal. A polarization beam splitter in the optical splitting means then splits the combined signal into at least two signal portions that have different polarizations (for example, orthogonal polarizations).

Advantageously, this optical separation means allows to mitigate polarization fading (that is to say signal attenuation when the polarizations of the backscatter signal and the local oscillator signal are not identical).

More importantly, in some cases, both polarizations may carry different information. This is particularly the case when asymmetric influences are applied to the fiber, such as a lateral force, which tends to act to vary the propagation velocity difference between the two polarization modes of the fiber (that is to say it changes the birefringence of the fiber).

The optical separation means is preferably then configured to direct a first signal portion corresponding to a first polarization to a first photodetector 203, and a second signal portion corresponding to a second different polarization is provided to a second photodetector 203.

Thus, a reconstruction device 3 according to the invention comprises at least one photodetector 203, preferably at least two photodetectors 203. Said one or more photodetectors are configured to convert the backscattered light signals of orthogonal polarizations into initial analog signals. An initial analog signal from the photodetector preferably has a frequency $v_A$.

A photodetector 203 can correspond to a balanced photodetector, photodiodes, avalanche photodiodes.

Preferably, the use of a 180° hybridizer with balanced photodetectors eliminates the losses associated with the splitter coupler.

Advantageously, each initial analog signal from said at least two orthogonally polarized backscattered light signals is an electrical signal directed to an electrical IQ demodulator.

Thus, a reconstruction device 3 according to the invention comprises an IQ demodulator 211, 302. The IQ demodulator is arranged to perform electrical homodyne detection on each of the initial analog signals. For example, it can be configured to perform electrical homodyne detection at the frequency $v_A$ by mixing the initial analog signals detected for each of the polarizations with reference analog signals having a frequency $v_A$.

In particular, it allows the generation of I and Q demodulated analog signals for each of the orthogonally polarized backscattered light signals.

Preferably, it allows to generate I ($I_1$, $I_2$) and Q ($Q_1$, $Q_2$) demodulated analog signals for each of the initial analog signals. Advantageously, an IQ demodulator can be configured to perform a phase shift of a portion of the backscattered light signals, of a portion of the initial analog signals or of a reference analog signal at the frequency $v_A$.

More preferably and as will be detailed hereafter, an IQ demodulator according to the invention is arranged to perform multiplication in phase and in phase quadrature of analog signals from each of the orthogonally polarized backscattered light signals with a reference signal. Thus, as will be detailed later, a portion of the backscattered light signals, a portion of the initial analog signals or the reference analog signal at the frequency $v_A$ can pass through a phase shifter.

The IQ demodulator may comprise at least one electrical mixer 205. Preferably, the IQ demodulator comprises two electrical mixers 205 for each initial analog signal. Thus, in one embodiment, an initial analog signal from one of the at least two orthogonally polarized backscattered light signals is directed to a sixth arm comprising an electrical mixer 205 and to a seventh arm also comprising an electrical mixer 205.

The initial analog signal from one of the at least two orthogonally polarized backscattered light signals can be mixed, by an electrical mixer 205, with a reference analog signal. Preferably, the analog reference signal comes from the modulator 104 at a frequency $v_A$. Optionally, the reference signal can be generated from an external source.

Nevertheless, before being mixed with an initial analog signal, a reference analog signal may pass through several components configured to modify its properties.

For example, an analog reference signal may be previously directed to an intermediate amplifier 204. The intermediate amplifier 204 is preferably adjustable. In addition, the intermediate amplifier allows the signal output to be amplified and the sensitivity to be increased. In addition, an analog reference signal, from the intermediate amplifier 204 or directly from the modulator, may also be directed to a phase shifter 206 as illustrated in FIG. 2.

Thus, the IQ demodulator may comprise a phase shifter 206. The phase shifter is configured to shift the phase of the incident signal. A phase shifter 206 can correspond to a 90° phase shifter, that is to say shifting the incident signal by 90°.

As illustrated in FIG. 2, the phase shifter 206 shifts the reference analog signal by 90° before it is directed to a mixer 205 arranged to mix it with an initial analog signal. The initial analog signal from one of the at least two orthogonally polarized backscattered light signals can then be mixed with a phase-shifted reference analog signal from the phase shifter 206 by the electrical mixer 205 as illustrated in FIG. 2.

Figure 3:
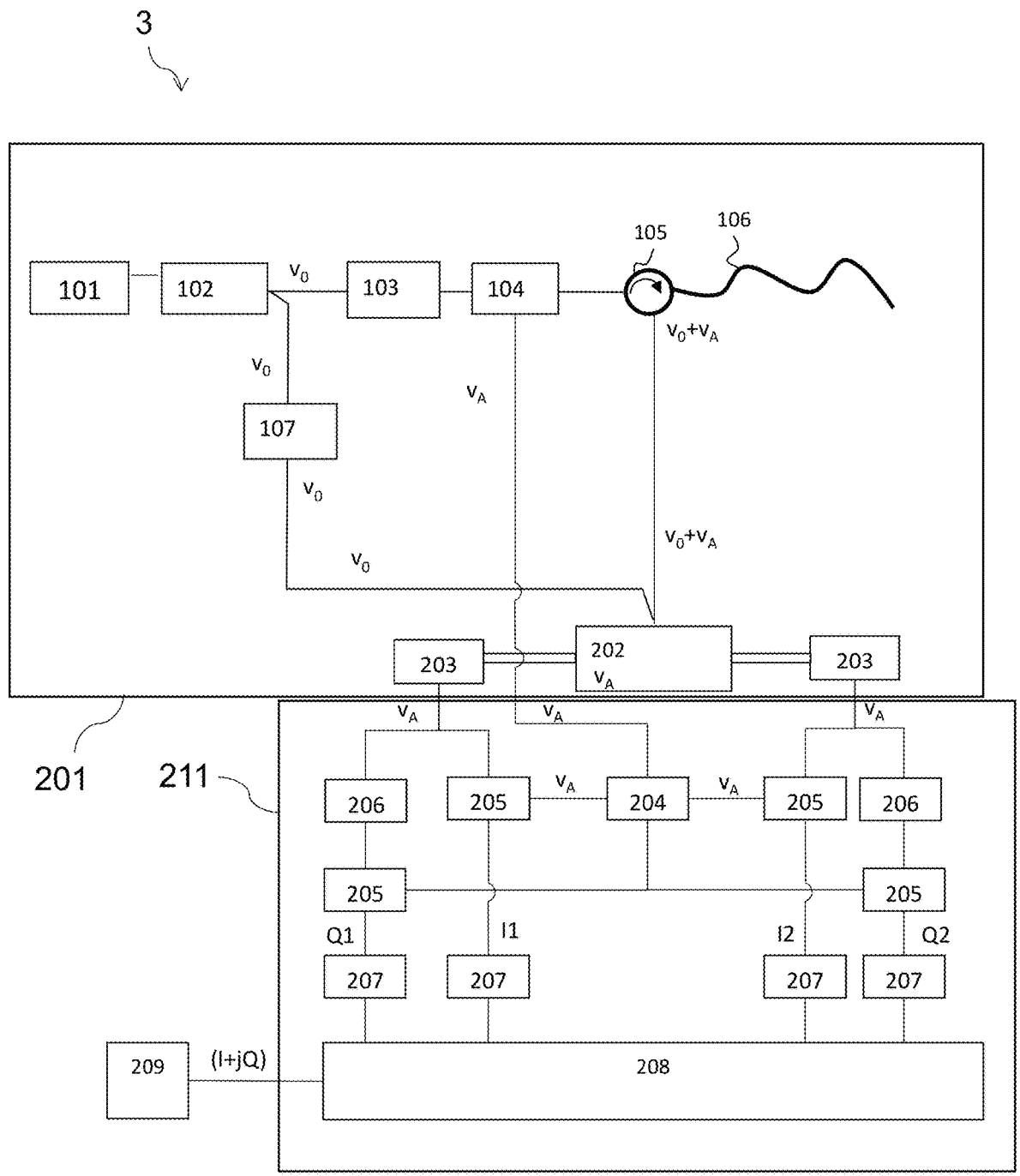
FIG. 3 shows a diagram of a device according to an embodiment of the invention.

According to a particular embodiment of the present invention illustrated in FIG. 3, the IQ demodulator may include at least one phase shifter 206 configured to shift the phase of an initial analog signal by 90° before it is directed to a mixer 205 arranged to mix it with a reference analog signal.

Figure 4:
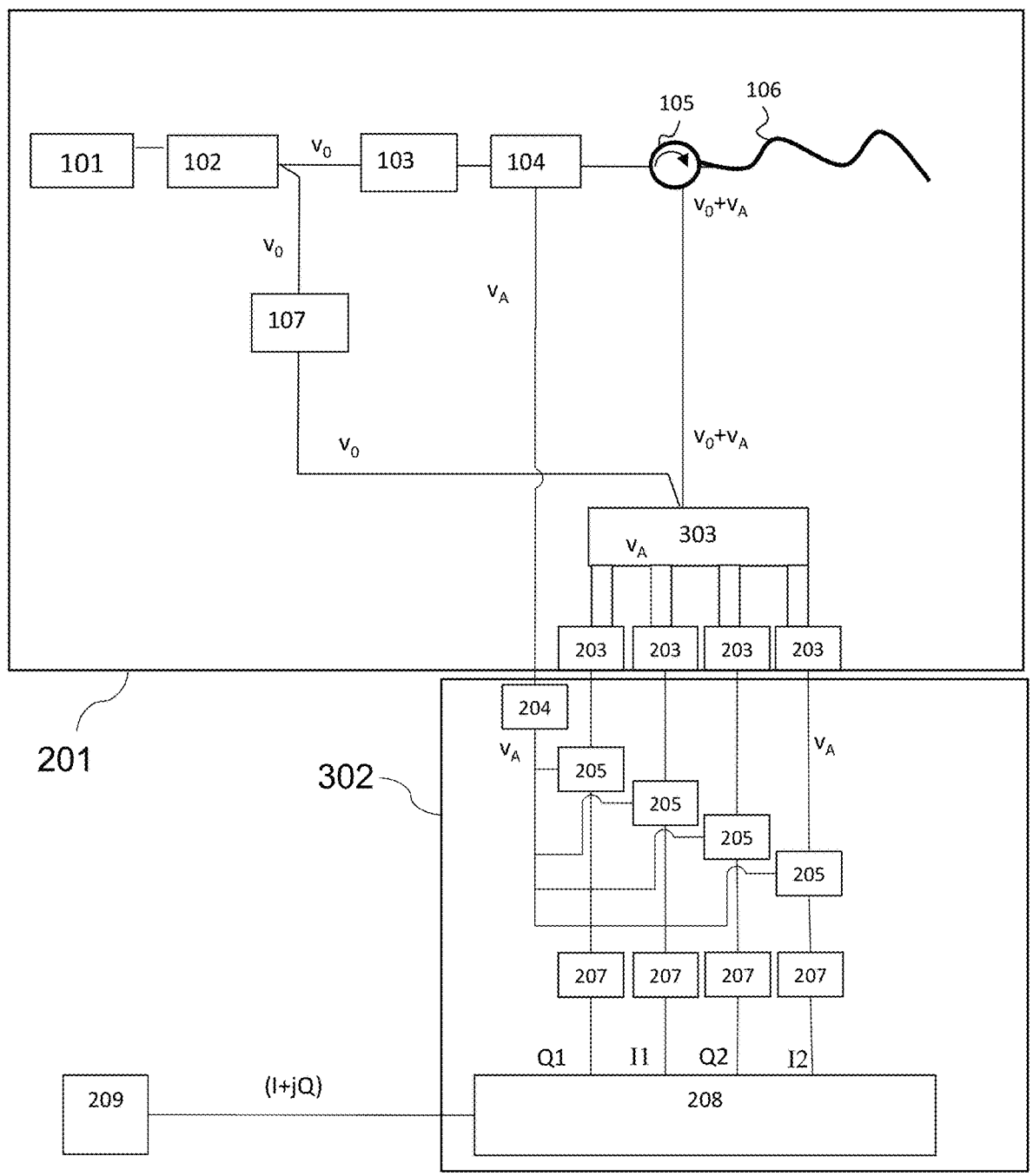
FIG. 4 shows a diagram of a device according to an embodiment of the invention.

Another embodiment of a reconstruction device 3 is shown in FIG. 4. In this embodiment, an optical separation means 303 is preferably a 90° hybridizer. Such a hybridizer is further configured to directly and optically generate the I-phase and Q-phase quadrature signal between the local oscillator and the signal of each orthogonal polarization. The use of a 90° hybridizer with balanced photodetectors eliminates the losses related to the splitter coupler.

In this embodiment, a first signal portion having a first polarization is provided to a first detector 203 and a second detector in phase quadrature with respect thereto. The second signal portion with a second different polarization is provided to a third detector 203 and a fourth detector in phase quadrature with respect thereto.

Furthermore, in this embodiment, an electrical phase shifter 206 is not required. The analog in-phase and phase-quadrature signals from the detectors 203 are each directly mixed with the signal from the modulator 104. The signal from the modulator 104 can also be amplified using an intermediate amplifier 204.

Thus, the electrical mixers 205 operating at the heterodyne frequency mix the initial analog signals detected for each of the polarizations with analog reference signals, in phase or in phase quadrature (that is to say, obtained using a phase shifter 206). Alternatively, as described above, the electrical mixers 205 operating at the heterodyne frequency mix the initial analog signals in phase or phase quadrature for each of the polarizations (that is to say, obtained using a phase shifter 206 or directly through a hybridizer as illustrated in FIG. 4) with a reference analog signal. The signal of interest, preferably at the heterodyne frequency $v_A$, is thus basebanded in phase I and phase quadrature Q with respect to the local oscillator for each of the detected polarizations.

The IQ demodulator may also include at least one filter 207. Preferably, the IQ demodulator includes a filter 207 for each in-phase and phase quadrature signal. A filter 207 can be used to select a frequency band above the zero frequency.

A filter is configured to filter the signal of interest at the basebanded heterodyne frequency.

A filter according to the invention may correspond to a low-pass filter, a band-pass filter or a high-pass filter. Preferably, it is a low-pass filter.

The filters, preferably low-pass, allow to obtain the complex envelope of the signal corresponding to the backscattered electromagnetic vector wave for each of the two orthogonal polarizations. Unlike a classical heterodyne setup, the signal of interest is not processed around a carrier frequency. Thus, obtaining the envelope of the signal allows an accelerated digital reprocessing.

Thus, as described, the IQ demodulator may comprise an acquisition system 208. The acquisition system 208 is configured to convert the one or more analog signals into a digital signal. The acquisition system is configured to receive in-phase and phase quadrature signals carrying amplitude and phase information for each of the two orthogonal polarizations.

Optionally, a synchronization can be performed to trigger the acquisition cards at each light pulse generated by the modulator and injected into the optical fiber. The acquisition system can also be configured to sample the incoming signals to acquire phase information therefrom.

The IQ demodulator allows an electrical homodyne detection for IQ demodulating each of the initial analog signals, to generate I ($I_1$, $I_2$) and Q ($Q_1$, $Q_2$) demodulated analog signals for each of the orthogonally polarized backscattered light signals, preferably of the initial analog signals corresponding to the two orthogonal polarizations.

These I ($I_1$, $I_2$) and Q ($Q_1$, $Q_2$) demodulated analog signals can be used to calculate a complex signal (I+jQ) which will contain all the information necessary for the reconstruction of the real signal. Indeed, since the IQ demodulator is configured to perform a multiplication in phase and in phase quadrature, the signal is divided into two orthogonal components linked by a trigonometric relation. One portion of the in-phase signal is cosine, while the other portion of the phase quadrature signal is sinusoidal. Thus, these two portions of a same signal become independent of each other so that the signal in phase corresponds to the real part of the complex signal and the signal in phase quadrature corresponds to the imaginary portion of the complex signal. Thus, the acquisition system can determine the complex amplitude (I+jQ) for each of the two orthogonal polarizations. This allows to calculate the phase and amplitude of the backscattered signal more reliably and thus to limit attenuation or fading of the signal.

As will be explained in the processing examples, unlike a system based on purely optical homodyne IQ demodulation, low frequency noise is mostly filtered out using a carrier frequency and electrical detection.

In addition, the acquisition in parallel on the two orthogonal polarizations of the complex amplitude (I+jQ) by the IQ demodulation allows the reconstruction of the backscattered electromagnetic vector wave of a pulse propagating in all or part of the optical fiber.

Furthermore, the I ($I_1$, $I_2$) and Q ($Q_1$, $Q_2$) demodulated analog signals can be used to calculate phase and amplitude values, which will give access to all the information necessary for the reconstruction of the real signal.

To this end, a reconstruction device 3 according to the invention may comprise a processing module 209. The processing module is configured to reconstruct the electromagnetic vector wave backscattered in all or part of the optical fiber 106 as a function of the determined complex amplitude values (I+jQ), or phase and amplitude values. Indeed, a mathematical relation allows to determine the backscattered electromagnetic vector wave as a function of complex amplitude values (I+jQ) determined from the I ($I_1$, $I_2$) and Q ($Q_1$, $Q_2$) demodulated analog signals generated. A mathematical relationship also allows the calculation of complex amplitude values from the phase and amplitude values.

The processing module is advantageously configured to identify optical axes along all or part of the length of the optical fiber corresponding to the maximum amplitudes detected. The maximum amplitudes can be determined by mathematical calculation from the determined complex amplitude values (I+jQ). Similarly, the phase values can be calculated from the determined complex amplitude values (I+jQ). The fading effect induced by the polarization is totally suppressed and above all the phase information is preserved, thus allowing to use it. Thus, the processing module 209 is capable of reconstructing the backscattered electromagnetic vector wave and thus, for example, calculating a main optical axis over a portion of or along the entire optical fiber.

Accessing the total electromagnetic wave allows to optimize the extraction of its properties. The complex amplitudes containing the amplitude and phase information of the two orthogonal polarizations acquired by the system are combined and not processed separately to provide and use only one complex amplitude of interest as a function of the position of the light pulse in the fiber.

The reconstruction device 3 allows to benefit from the advantages and particularly the precision of a digital demodulation while avoiding to sample the frequency with a sufficient resolution and to have a sufficient computing power for a digital phase extraction.

Figure 5:
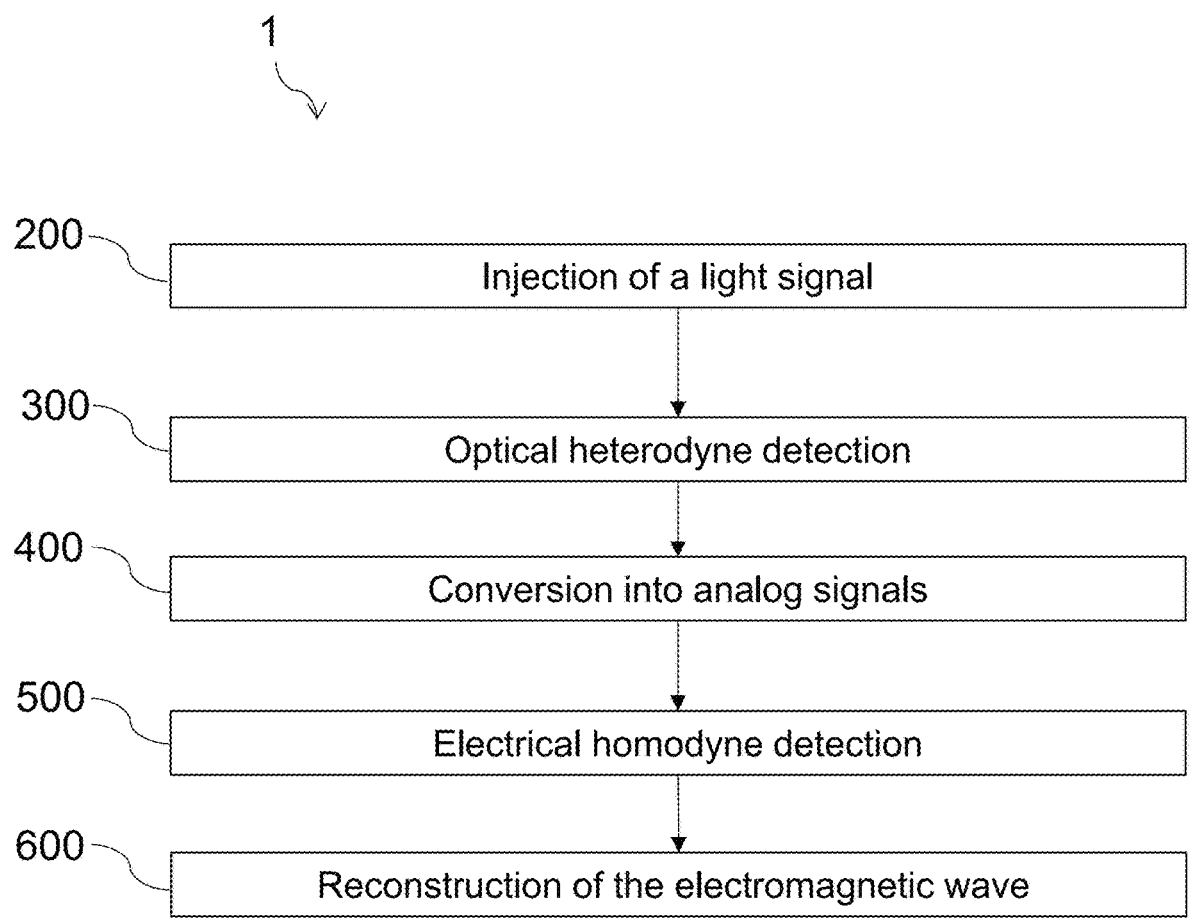
FIG. 5 shows a diagram of a method according to an embodiment of the invention.
Figure 6:
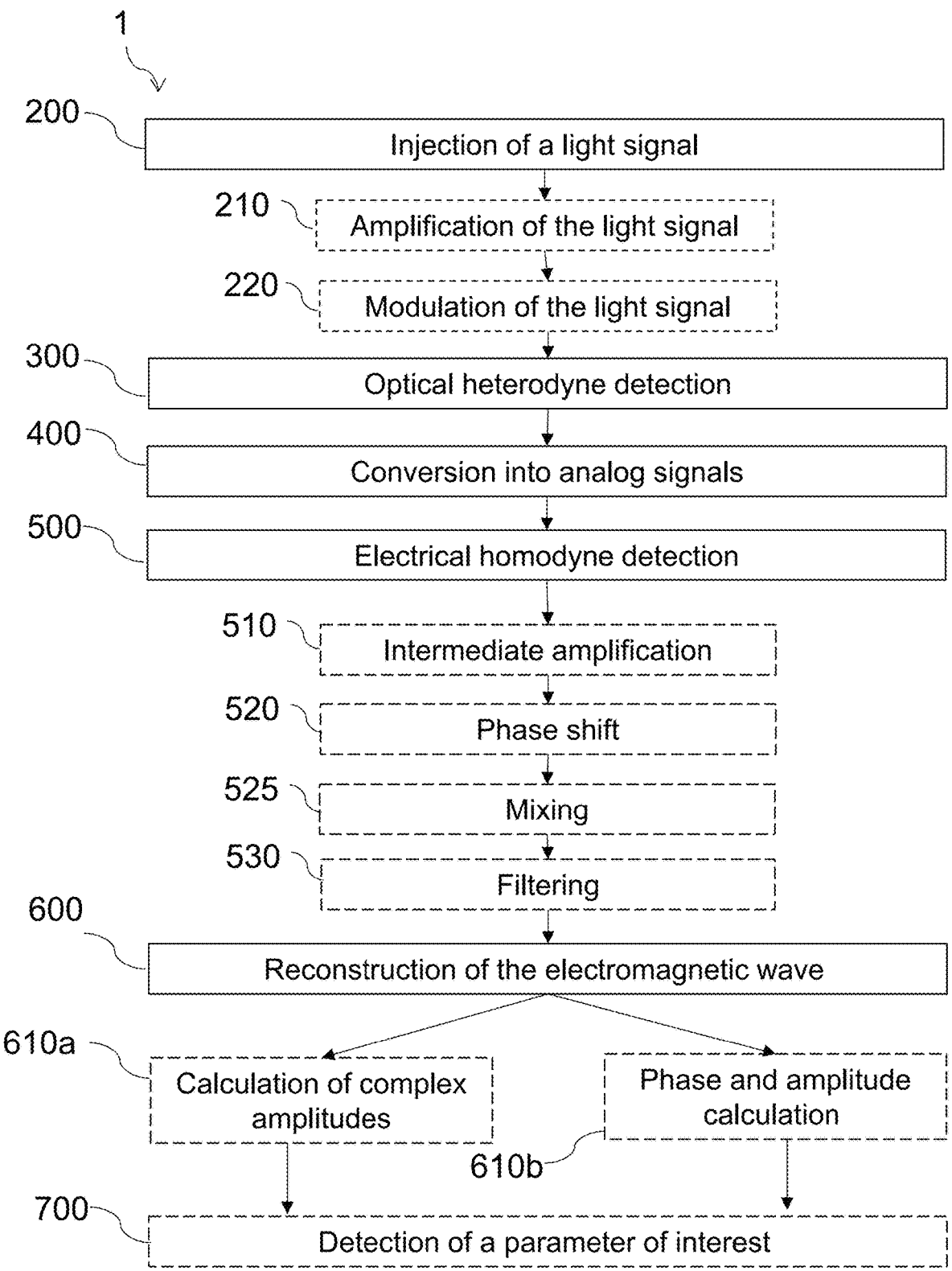
FIG. 6 shows a diagram of a method according to an embodiment of the invention.

According to another aspect, the invention relates to a method 1 for reconstructing an electromagnetic vector wave backscattered in all or part of an optical fiber 106 as illustrated in FIGS. 5 and 6.

A reconstruction method 1 according to the invention comprises a step 200 of injecting into the optical fiber 106 a light signal, preferably of a frequency $v_0+v_A$. The frequency $v_0+v_A$ is preferably obtained by a frequency shift of a light signal of a frequency $v_0$. The frequency shift can be realized by a modulator 104. In addition, the light signal of a frequency $v_0$ can be generated by a light source 101.

Alternatively, the method may include a step 200 of injecting a light signal of a frequency $v_0$ into the optical fiber 106. In this case, it is the light signal that is directed to a local oscillator 107 which has a frequency $v_0+v_A$.

Thus, the method may include a step of separating the light signal from the light source. The separation step can be performed by a polarization-maintaining optical coupler 102. The light signal is divided into two portions of an identical frequency $v_0$. The signal is directed to two distinct paths. One portion of the light signal is directed to an amplifier 103 and the other portion of the light signal is directed to a local oscillator 107.

A method according to the invention may comprise a step 210 of amplifying the light signal. This step is implemented by an amplifier 103. The amplification step increases and controls the optical power of the light signal prior to injection of the light signal into the optical fiber 106.

A reconstruction method 1 according to the invention may comprise a step of modulating 220 the light signal. The modulation can be performed by a modulator 104. Preferably, the modulation is implemented prior to the step 200 of injecting into the optical fiber 106. The modulation can allow a shift in the frequency of the light signal by a value equal to $v_A$. The frequency resulting from the modulation can be shifted (up or down) with respect to the frequency of the light signal from the light source. The modulation may include generating different frequency pulses at a predetermined duration and repetition rate.

The modulated light signal is injected into the optical fiber, which generates a Rayleigh backscatter signal.

A reconstruction method 1 according to the invention may comprise a polarization-resolved heterodyne optical detection step 300. This optical detection step 300 advantageously includes the generation of at least two backscattered light signals of orthogonal polarizations, producing a beat preferably of a frequency $v_A$. In particular, this generation can be realized by an optical separation means and from a backscatter of the injected light signal and an electromagnetic wave from a local oscillator.

The backscattered light signal of a frequency $v_0$ or $v_0+v_A$ is then coupled with the light signal from the local oscillator 107 at a frequency $v_0$ or $v_0+v_A$. The coupling of the frequencies $v_0$ and $v_0+v_A$ allows said at least two backscattered light signals of orthogonal polarizations to preferably have a frequency $v_A$. In addition, when the backscatter signal is mixed with the signal from the local oscillator, the signals combine to provide a frequency difference that retains both the amplitude and phase information of the backscatter signal, provided the local oscillator has a constant intensity and a sufficiently narrow band. The local oscillator and backscatter signals have different frequencies, so the step can correspond to a heterodyne optical detection.

Heterodyne detection consists in recombining the backscattered signal to be analyzed with the light signal of the local oscillator 107, the two having frequencies that differ.

As described so far, the advantage of heterodyne detection is the improvement of the signal-to-noise ratio, as well as an improvement of the dynamic range since the heterodyne signal is proportional to the square root of the backscatter intensity.

In addition, the generation step allows the signal mixture to be separated into two orthogonal polarizations. This mitigates polarization fading and signal attenuation when the polarizations of the backscatter signal and the local oscillator signal are not identical.

The backscatter light signals of orthogonal polarizations are directed to at least two separate detectors 203, one for each of the orthogonal polarizations. Optionally, the orthogonally polarized backscatter light signals can be directed to four separate detectors 203.

A reconstruction method 1 according to the invention may comprise a step 400 of converting backscattered light signals of orthogonal polarizations into initial analog signals. Preferably, this step is performed by at least one photodetector 203.

This allows the generation of electrical signals containing the information of the backscattered signal. Each initial analog signal corresponding to one of the light signals of orthogonal polarizations is then directed to an electrical homodyne detection step 500.

Figure 7:
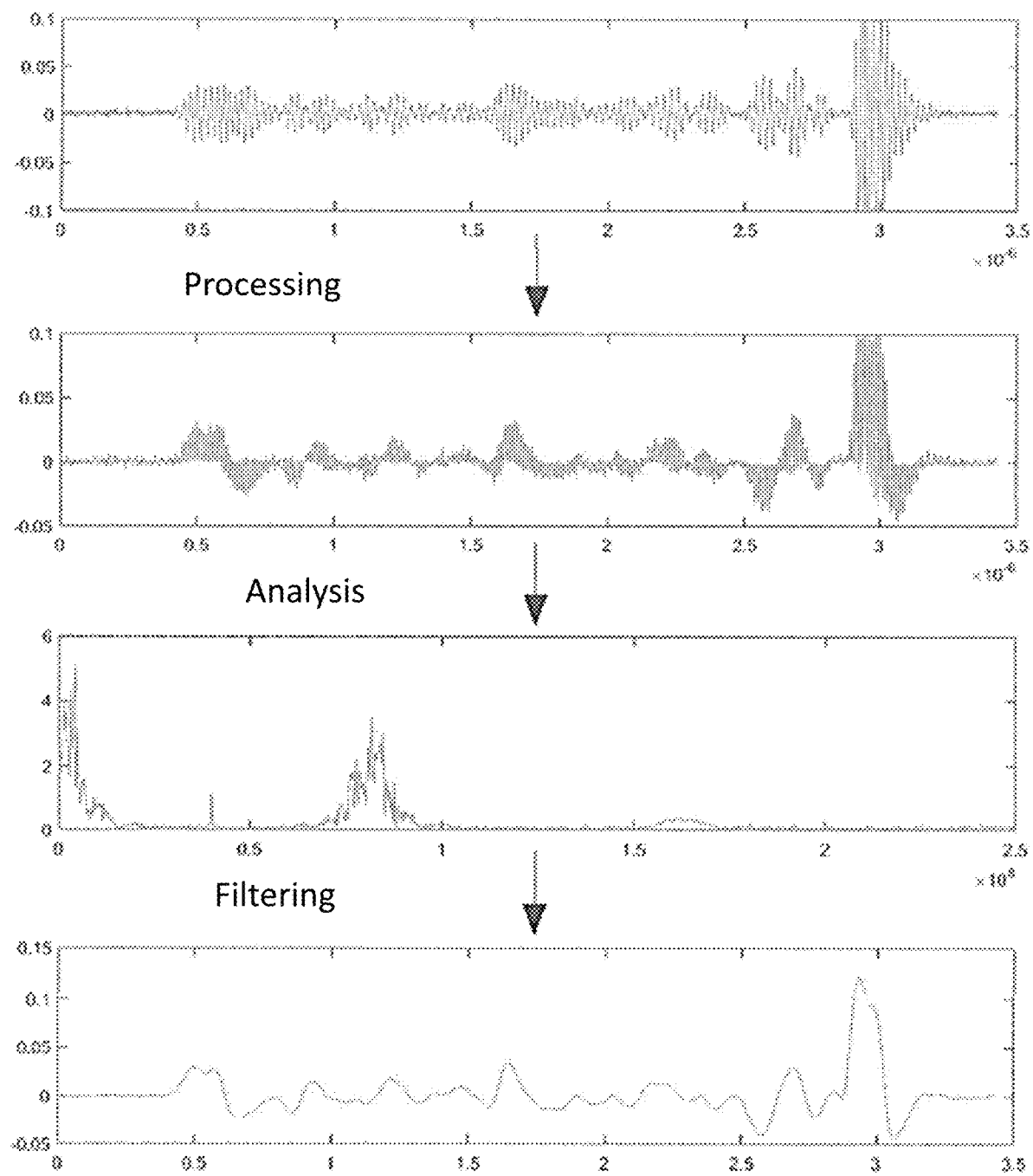
FIG. 7 shows a diagram of an embodiment of an electrical heterodyne detection according to the invention.

A reconstruction method 1 according to the invention may comprise an electrical homodyne detection step 500. This step is preferably performed by an IQ demodulator for IQ demodulating each of the initial analog signals. A homodyne detection step according to one embodiment of the invention is illustrated in FIG. 7. This electrical homodyne detection can be performed at the frequency $v_A$ by mixing the initial analog signals detected for each of the polarizations with reference analog signals having a frequency $v_A$. The electrical homodyne detection step 500 allows I ($I_1$, $I_2$) and Q ($Q_1$, $Q_2$) demodulated analog signals to be generated for each of the backscattered light signals of orthogonal polarizations.

Each analog signal corresponding to one of the orthogonal polarization light signals is split into two portions before being directed to a mixing step 525.

Advantageously, the mixing step 525 allows in-phase multiplication and phase quadrature multiplication of analog signals from each of the orthogonally polarized backscattered light signals with a reference signal.

Thus, a method according to the invention may also comprise a step 520 of shifting the phase of a portion of the backscattered light signals, a portion of the initial analog signals or a portion of the reference analog signal.

According to a particular embodiment of the invention, the demodulation step IQ may comprise a step of shifting the phase of a portion of a reference analog signal at the frequency $v_A$. Preferably this signal, preferably electrical, comes from the modulator 104. Only a portion of the reference analog signal at the frequency $v_A$ is then phase-shifted and multiplied with each of the initial backscattered analog signals as illustrated in FIG. 2. This embodiment has the advantage of using a photodiode balanced by detected polarizations and an electrical IQ demodulation based on the phase shift of the reference signal of a frequency $v_A$ coming from the modulator, the properties of which remain constant in time.

According to another particular embodiment of the invention, the IQ demodulation step may comprise a step of shifting the phase of a portion of the initial analog signals, preferably corresponding to a backscattered light signal, and then multiplying with a reference analog signal. Preferably, only a portion of each initial analog signal corresponding to one of the orthogonally polarized backscattered light signals is phase-shifted and then multiplied with the reference analog signal $v_A$ as illustrated in FIG. 3. This embodiment has the advantage of using a photodiode balanced by detected polarizations and an electrical IQ demodulation.

According to yet another particular embodiment of the invention, the IQ demodulation step may comprise a step of shifting the phase of a portion of the backscattered light signals as illustrated in FIG. 4. In this embodiment, the backscattered light signals are optically phase shifted, which makes the electrical detection scheme simpler. This embodiment requires the use of four balanced photodetectors against only two for the two previous embodiments.

Thus, the electrical homodyne detection step may comprise a phase-shifting step 520. This step can be performed by at least one phase shifter 206.

Alternatively, the heterodyne optical detection step comprises a phase-shifting step. This step can be performed by a 90° hybridizer.

In addition, the phase-shifting step may be preceded or followed by an intermediate amplification step 510. The intermediate amplification step corresponds to an amplification of the electrical signal from the modulator 104 at the modulation frequency $v_A$. The amplification step can be implemented by an intermediate amplifier.

The amplified signal from the modulator 104 can then be directed to the phase-shifting step 520 and to a mixing step.

Furthermore, and preferably following the phase-shifting step, a method according to the invention may comprise a step of mixing 525 each of the initial analog signals corresponding to a backscattered light signal with the reference analog signal (in phase and/or in phase quadrature), preferably from the modulator 104, at a frequency $v_A$. Preferably, this step is performed by at least one electric mixer 205.

Thus, each portion of each initial analog signal from one of the two backscattering light signals of orthogonal polarizations is mixed, on the one hand, with a reference analog signal from the modulator 104, corresponding to an in-phase multiplication. The other portion of each initial analog signal from one of the two backscattering light signals of orthogonal polarizations is mixed with a 90° phase-shifted reference signal from the modulator 104, corresponding to a phase quadrature multiplication of the signal.

Alternatively, the other portion of each initial analog signal from one of the two backscattering light signals of orthogonal polarizations can be phase-shifted by 90° and mixed with a reference signal from the modulator 104, corresponding to a phase quadrature multiplication.

A method implemented by the invention may comprise an analog filtering step 530 for suppressing a portion of the frequencies of the analog signals, preferably higher than a predetermined threshold. Preferably, the analog filtering step corresponds to a high frequency filtering step. This allows to keep only the low frequencies. This step can be performed by means of a low-pass filter 207.

Thus, the filtering step allows to get rid of the noise that can be generated during the amplification and phase-shifting step, to keep only the in-phase and quadrature phase signals. This allows the noise of the final signal to be reduced.

Thus, the step 500 of homodyne electrical detection, by a demodulator IQ, for IQ demodulating for example each of the analog signals of the backscattered light signals, allows I ($I_1$, $I_2$) and Q ($Q_1$, $Q_2$) demodulated analog signals to be generated for each of the analog signals of the backscattered light signals.

Furthermore, and preferably, both polarizations are detected in parallel in a time-synchronized manner, that is to say at the same time.

Figure 8:
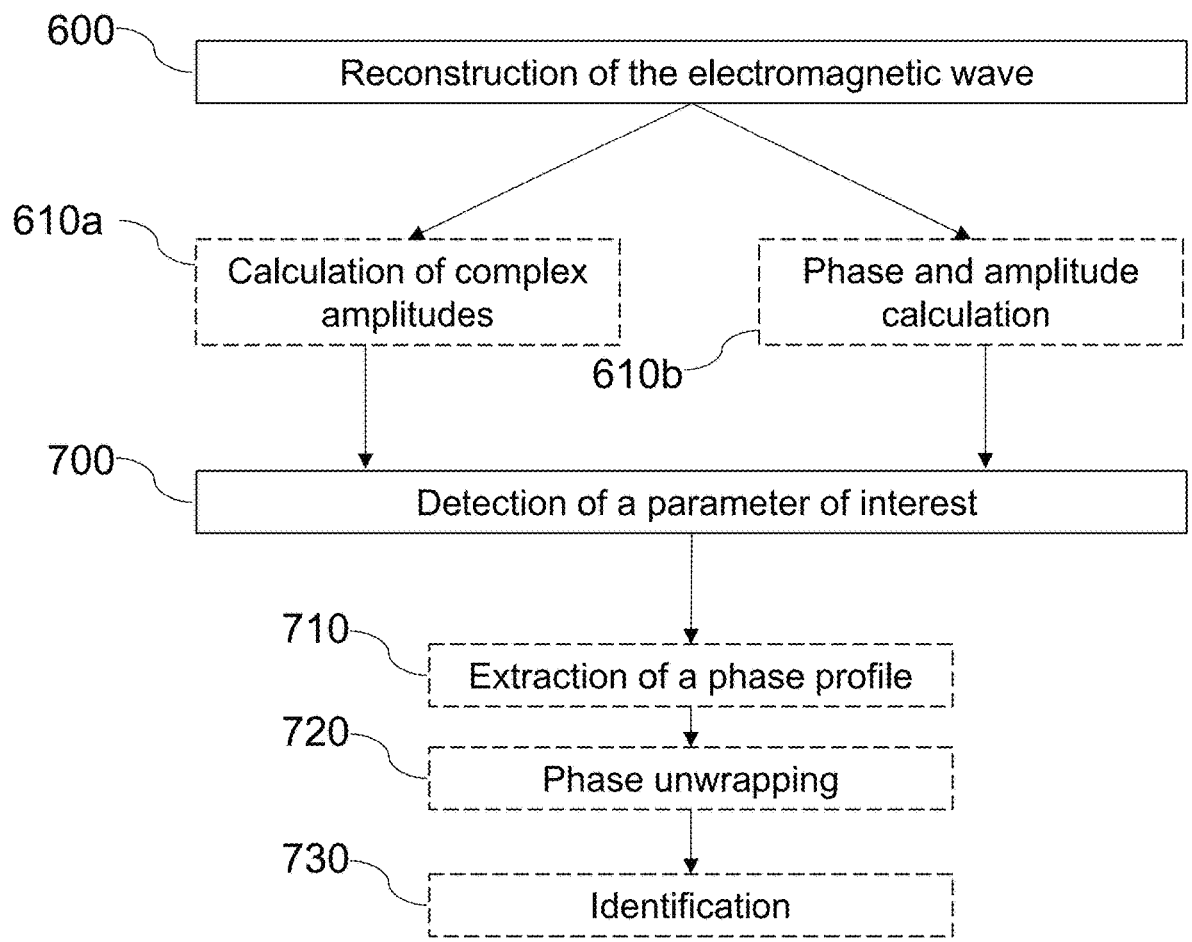
FIG. 8 shows a diagram of a step of reconstructing the electromagnetic vector wave according to an embodiment of the invention.
Figure 9:
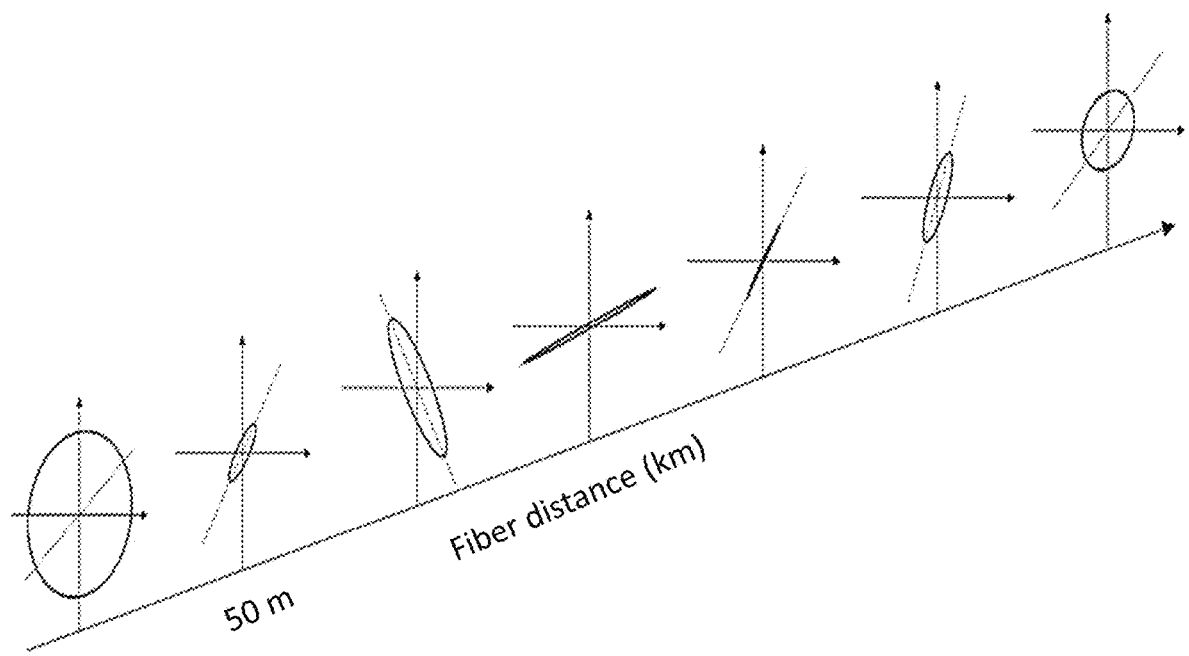
FIG. 9 shows a diagram of an example of a reconstructed backscattered electromagnetic vector wave.

A reconstruction method 1 according to the invention may comprise a step 600 of reconstructing the electromagnetic vector wave backscattered in all or part of the optical fiber 106, preferably as a function of complex amplitude values (I+jQ) or determined phase and amplitude values, from the I ($I_1$, $I_2$) and Q ($Q_1$, $Q_2$) demodulated analog signals generated. This step may be performed by a processing module 209, as shown in FIG. 8 and FIG. 9. Indeed, as described previously, these I ($I_1$, $I_2$) and Q ($Q_1$, $Q_2$) demodulated analog signals can be used to calculate a complex signal (I+jQ) which will include all the information necessary for the reconstruction of the real signal and thus for the reconstruction of the electromagnetic vector wave. These I ($I_1$, $I_2$) and Q ($Q_1$, $Q_2$) demodulated analog signals can be used to calculate phase and amplitude values which will contain all the information necessary for the reconstruction of the real signal and thus for the reconstruction of the electromagnetic vector wave.

The method may comprise a step 610a of calculating the complex amplitude (I+jQ) from the I ($I_1$, $I_2$) and Q ($Q_1$, $Q_2$) demodulated analog signals. In addition, the step of reconstructing the backscattered electromagnetic vector wave may comprise a step of calculating the phase and/or the amplitude of the backscattered light signal from the determined complex amplitudes (I+jQ). Preferably, this calculation step is performed in all or part of the optical fiber. Furthermore, this step can be performed for any projection axis in all or part of the optical fiber according to the complex amplitude values (I+jQ) determined from the I ($I_1$, $I_2$) and Q ($Q_1$, $Q_2$) demodulated analog signals generated.

In addition, a method according to the invention may comprise a step 610b of calculating the phase and amplitude from the I ($I_1$, $I_2$) and Q ($Q_1$, $Q_2$) demodulated analog signals. In addition, the step of reconstructing the backscattered electromagnetic vector wave may comprise a step of calculating the complex amplitude (I+jQ), in all or part of the optical fiber from the phase and amplitude values calculated from the I ($I_1$, $I_2$) and Q ($Q_1$, $Q_2$) demodulated analog signals generated.

The method may comprise a step of calculating the complex amplitude of the backscattered light signal from the determined phase and amplitude values. Preferably, this calculation step is performed in all or part of the optical fiber.

A plurality of amplitude values and/or phase values are obtained in all or part of the optical fiber and for each orthogonally polarized light signal.

In addition, the reconstruction step 600 may comprise a calculation of the complex amplitude and/or amplitude and/or phase of the backscattered signal for all angles of the electric field and over all or part of the optical fiber. The calculation of the complex amplitude and or amplitude and/or phase for all angles of the electric field can correspond to the creation of a vector, by changing the reference frame. Furthermore, the angle is between 0 and $2\pi$, for example.

Preferably, the calculation of a maximum amplitude includes identifying an optimal angle associated with the maximum amplitude for any projection axis in all or part of the optical fiber. The optimal angle preferably corresponds to the angle having the highest maximum amplitude among amplitudes of a plurality of angles corresponding to the projection axes in all or part of the optical fiber, preferably to the projection axes defined in the cross-sectional plane in all or part of the optical fiber.

Preferably, the calculation is performed at a plurality of points of all or part of the optical fiber.

By trigonometric relation, following the change of reference frame and the presence of said vector, the behavior of the electromagnetic vector wave backscattered in all or part of the optical fiber can be characterized and thus the backscattered electromagnetic vector wave reconstructed.

Reconstructing entirely the backscattered electromagnetic vector wave further allows the complete and simultaneous access to the properties that characterize it (amplitude, phase, polarization state, degree of polarization) and that electromagnetically characterize its propagation medium (index variation, optical path, birefringence, polarization modal dispersion) and this in a distributed way in all or part of the fiber. Thus, thanks to the invention, these properties can be used in isolation or in combination to determine, in a distributed manner in all or part of the interrogated optical fiber, a variation of one or more environmental influences acting on the behavior of the electromagnetic wave.

This allows to obtain the maximum amplitude and the projection angle necessary to reach the maximum amplitude for all or part of the optical fiber. Preferably, the calculation of the maximum amplitude comprises identifying an angle from a plurality of angles corresponding to possible projection axes defined in the cross-sectional plane of the fiber in all or part of the optical fiber corresponding to the main optical axis.

Thus, the maximum amplitudes can be determined by mathematically calculating from the complex amplitude values (I+jQ) or the corresponding phase and amplitude values determined. Similarly, the corresponding phase values can be calculated from the determined complex amplitude values (I+jQ).

A method according to the invention may comprise a step of detecting 700 a parameter of interest, in particular as illustrated in FIG. 8.

Thus, a method according to the invention may further comprise a step 710 of extracting a phase profile. This step is preferably performed for each projection and/or for each phase calculated from the determined complex amplitudes (I+jQ). Indeed, for each projection, the phase can be deduced which allows to deduce a phase profile.

A method according to the invention may comprise a phase unwrapping step 720. Indeed, the phase being circular, it varies according to an angle between 0 and $2\pi$ ($\pi$ and $-\pi$). Thus, when the phase is detected, if the phase difference between two points is greater than $\pi$, this phase is added to $\pi$.

This allows to get rid of the cyclic effect of the phase.

Moreover, thanks to the reconstruction of the backscattered electromagnetic vector wave, it is also possible to reconstruct the main optical axis according to the maximum amplitudes and thus the maximum signal. Thus, thanks to the method according to the invention, the phase extraction or calculation is no longer limited to a single optical axis and thus to the phenomenon of fading.

Figure 10:
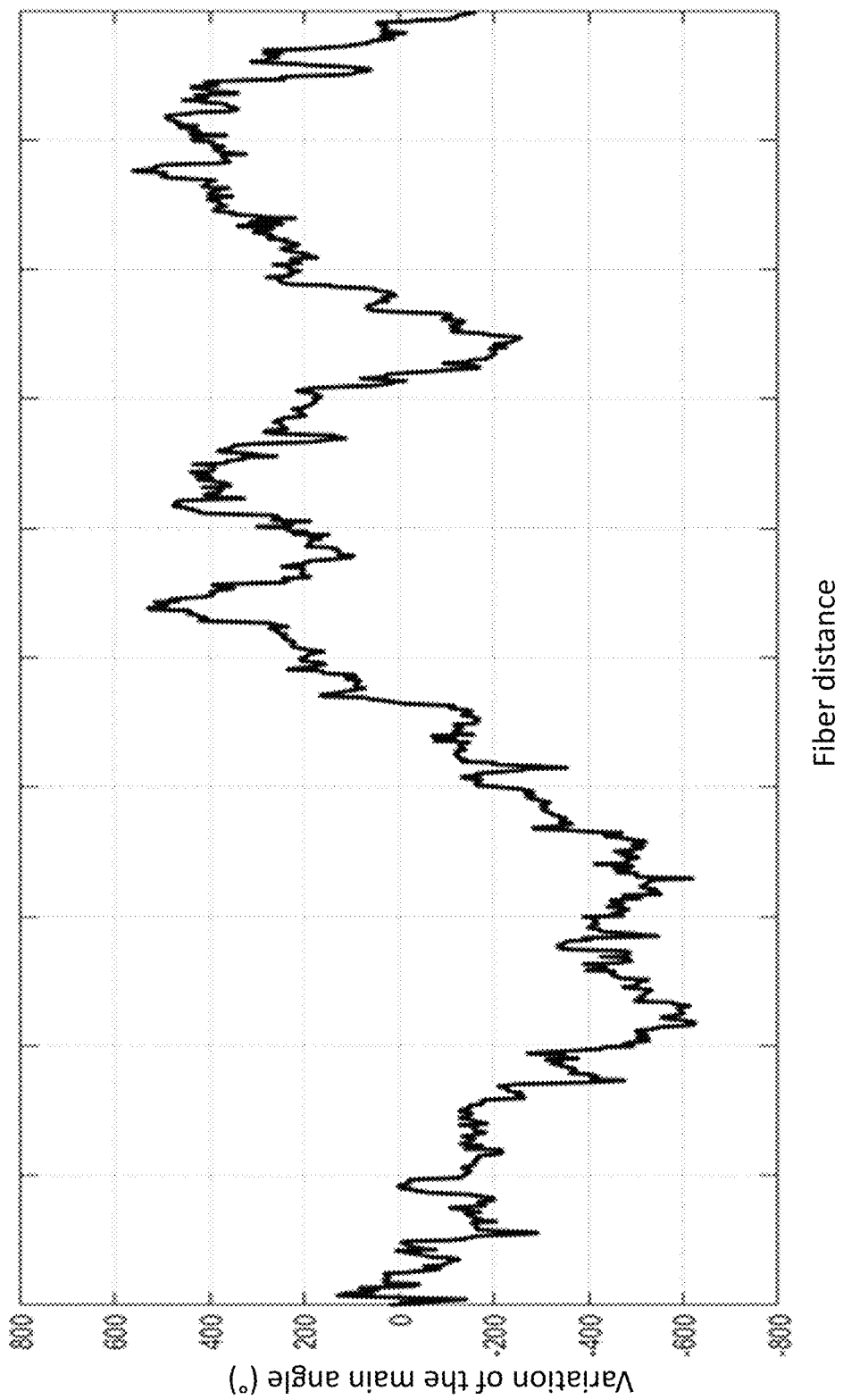
FIG. 10 shows the variation of the angle of the main axis of the backscattered electromagnetic wave as a function of the distance of the optical fiber during the propagation of a pulse in said optical fiber.

Furthermore, a method according to the invention may comprise a step of identifying 730, along all or part of the length of the optical fiber 106, the main optical axis corresponding to the maximum amplitudes or to the angle having the highest amplitude compared to all the calculated amplitudes. Such identification is shown in FIG. 10. Indeed, each optical axis has a different amplitude and phase, the behavior of the electric field of the backscattered electromagnetic wave being then different in all or part of the optical fiber. Thus, this step consists in determining on all or part of the optical fiber the optical axes on which the amplitude of the signal is the most important. Such a step may include a projection of the complex amplitudes on each optical axis.

Thus, the processing module is able to reconstruct a main optical axis according to the calculated amplitude and phase values.

A reconstruction method 1 according to the invention also allows, for example, to identify a specific angle, to compare different angles of one or more optical fibers or to identify specific axes and their different evolutions. The invention is particularly advantageous in the sense that it allows to mitigate the fading phenomenon and to recover more than 3 dB that can be lost due to the couplers. Thus, it is possible to recover more than 50% of the signal and to greatly improve the analyses by distributed fiber optics and Rayleigh backscatter measurements.

Figure 11:
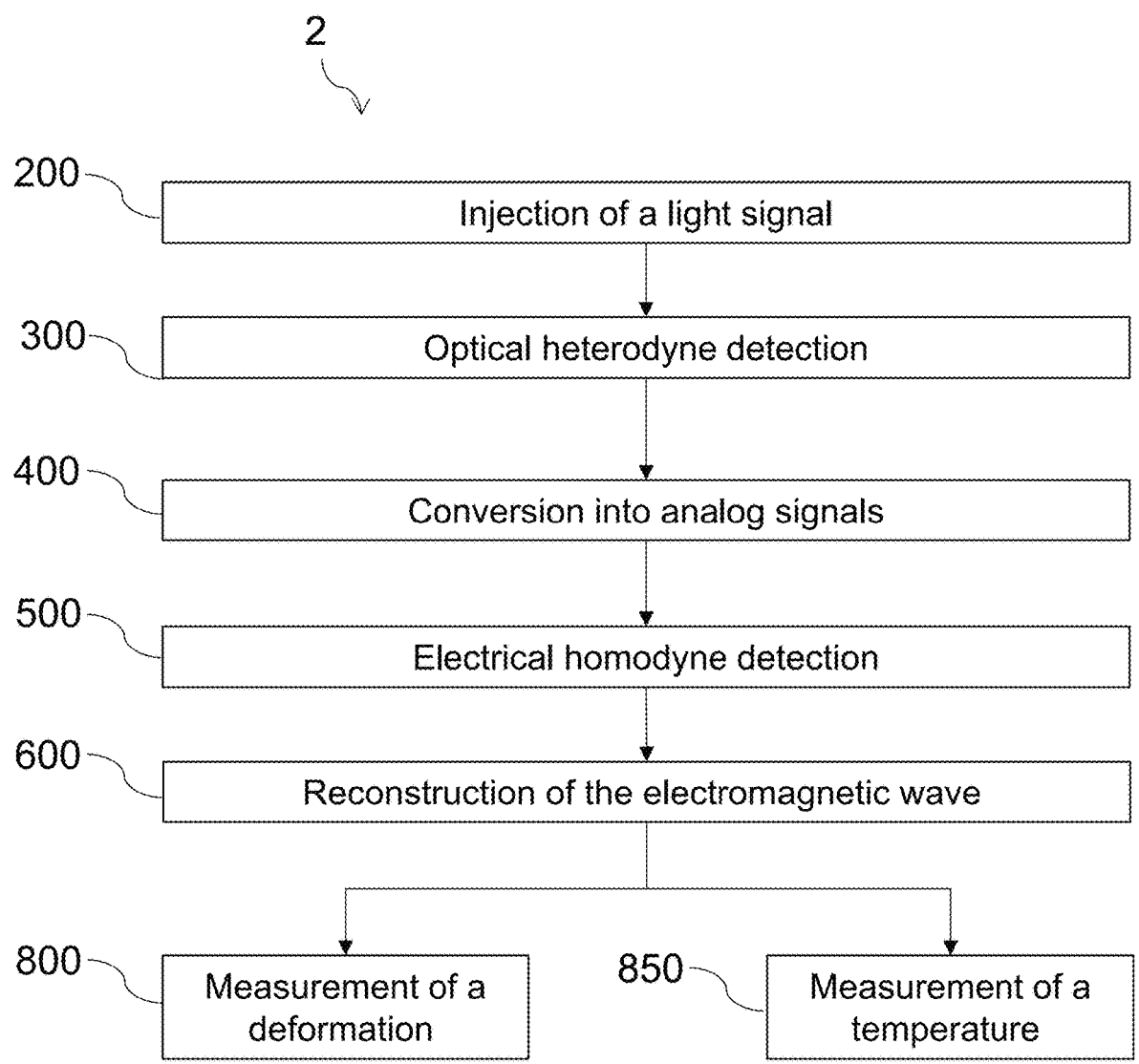
FIG. 11 shows a diagram of a method of optoelectronic measurement according to an embodiment of the invention.

According to another aspect, the invention relates to a method 2 for optoelectronic measurement in a distributed acoustic detection system as illustrated in FIG. 11.

The Distributed Acoustic Sensing (DAS for Distributed Acoustic Sensing in Anglo-Saxon terminology) system detects vibrations and captures acoustic energy along the optical fiber. In addition, this system allows the detection of acoustic frequency signals over long distances. The acoustic disturbance on the fiber generates its elongation or its compression which causes a change of phase relation. In addition, this method may comprise a comparison to determine how the phase varies from one point on the optical fiber to another as the phase difference is proportional to the elongation or compression of the fiber. Thanks to the invention, the phase difference measurement is preferably performed on the main optical axis which corresponds to the axis where phase extraction is optimized. Thus, this step allows to determine how the phase varies between two points. Advantageously, these systems are low cost and highly reliable.

An optoelectronic measurement method 2 may comprise reconstructing an electromagnetic vector wave backscattered in all or part of an optical fiber 106 according to the invention and as previously described.

An optoelectronic measurement method 2 may comprise measuring a deformation 800 and/or temperature variation 850 of the optical fiber 106 as a function of the reconstructed backscattered electromagnetic vector wave.

When a light signal is backscattered, it contains information related to the environmental influences of the fiber. Thus, if the environment of the optical fiber undergoes a stress (deformation for example), the backscattered signal of the fiber will include the information of this deformation. The optical fiber allows a measurement of a deformation 800 but also of temperature variation 850.

Indeed, while the above has described the phase or amplitude difference of the backscatter signal as an incident stress on the optical fiber, other parameters, such as temperature changes, also have the ability to affect the phase between sections of the fiber. In addition, the stress on the fiber may result from other external effects than those discussed above. For example, a change in pressure in the fiber may cause stress on the fiber, such as a conversion of pressure to stress by the fiber coating.

An optoelectronic measurement method 2 may comprise measuring a deformation of the optical fiber 106 along the reconstructed main optical axis.

As detailed previously, the electromagnetic wave is linked to the main optical axis. Thus, from the backscattered electromagnetic vector wave reconstructed according to the invention, the main optical axis can also be reconstructed.

The method according to the invention also comprises measuring a deformation of the optical fiber or a temperature variation on the main optical axis reconstructed according to the invention. Preferably, the measurement of the deformation is performed by an optical fiber.

DAS signals are known for optical fading, in which the signal strength is time-dependent due to slow changes in the fiber that result in changes in the optical path length. Using the method according to the invention, the system can be optimized to generate a better signal analysis by DAS.

Reconstructing entirely the backscattered electromagnetic vector wave further allows the complete and simultaneous access to the properties that characterize it (amplitude, phase, polarization state, degree of polarization) and that electromagnetically characterize its propagation medium (index variation, optical path, birefringence, polarization modal dispersion) and this in a distributed way in all or part of the fiber. Thus, thanks to the invention, these properties can be used in isolation or in combination to determine, in a distributed manner in all or part of the interrogated optical fiber, a variation of one or more environmental influences acting on the behavior of the electromagnetic wave.

EXAMPLES

Figure 12:
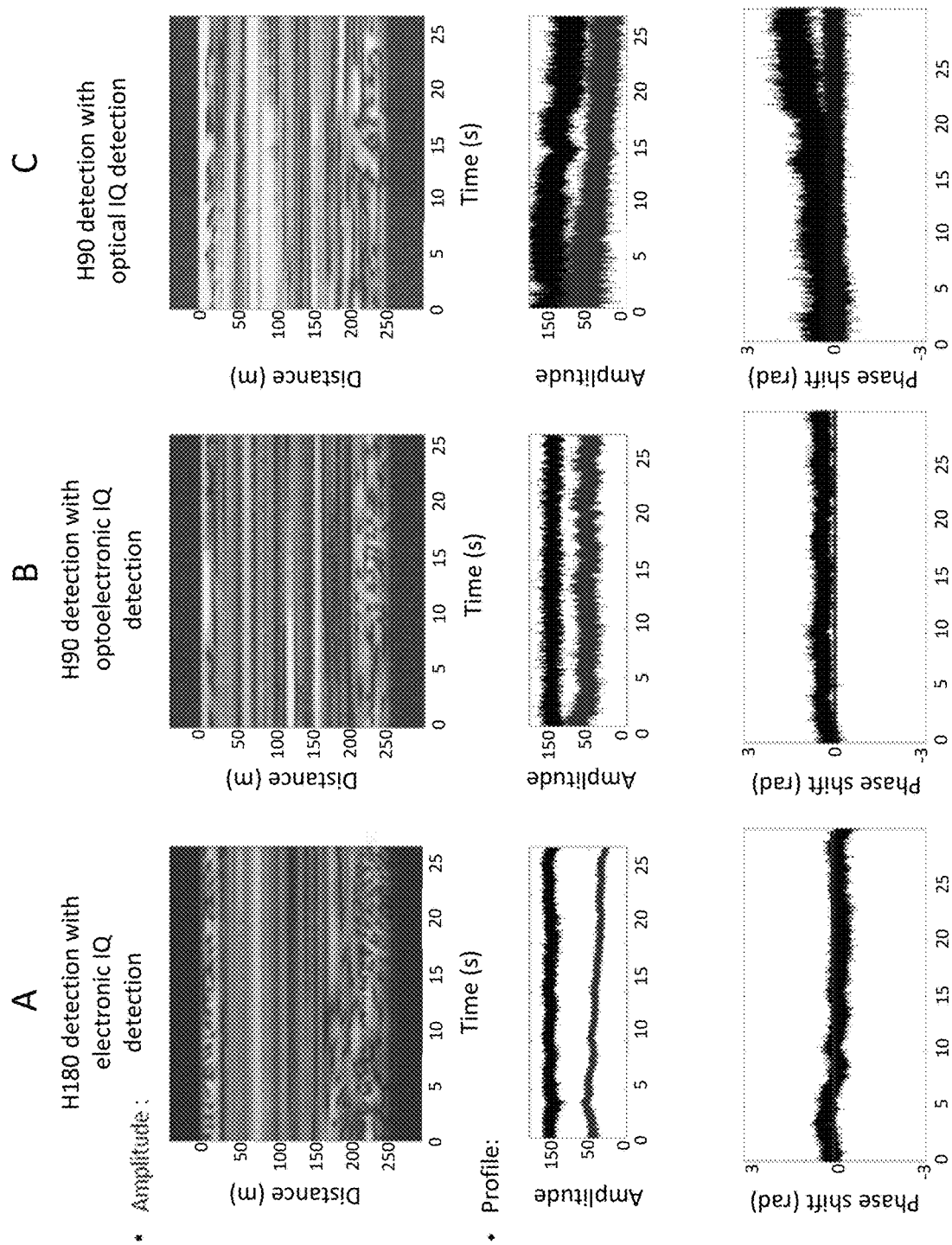
FIG. 12 shows a comparison of amplitude and phase calculation steps according to different embodiments of the invention (A, B) compared to the state of the art (C).

An exemplary embodiment of a method according to the invention and prior art techniques are illustrated in FIGS. 12A, 12B, 12C.

A first detection with a 180° hybridizer (H180) with electronic IQ detection is performed and plotted in FIG. 12A. This example illustrates the amplitude and phase results obtained by a method according to the invention, as illustrated in FIG. 2.

Using this method, the amplitude profile is obtained with particular precision. In addition, such a method generates very little noise. Thanks to such a quality of amplitude results, it is easy to calculate or deduce the phase in order to characterize and thus reconstruct the backscattered electromagnetic vector wave. Conveniently, the electric vector, as described above, oscillates according to the environmental influences on the fiber. Such an electric vector oscillates according to a phase and an amplitude. Thanks to the method according to the invention, the amplitude and phase obtained have low noise levels, so it is particularly advantageous to extract the amplitude and phase values characterizing the backscattered electromagnetic vector wave for each polarization.

The reconstruction of the backscattered electromagnetic vector wave allows the characterization of several environmental influences that can be exerted on all or part of the optical fiber. Advantageously, the method does not exhibit any discontinuity in time and space.

A second detection is performed with a 90° hybridizer (H90) with optoelectronic IQ detection and reported in FIG. 12B. This example illustrates the results obtained by a method according to the invention as illustrated in FIG. 4.

The amplitude and phase profile have higher noise levels than with H180 detection with electronic IQ detection, however, it is easy to trace the exact amplitude and phase using this detection.

Indeed, thanks to the homodyne electrical detection, the noise and the fading phenomenon for the phase extraction are strongly reduced. Phase extraction is achieved with very little noise, even for weak signals in the optical fiber. Phase extraction is performed on the projection of the electric field. In addition, it is also possible to identify its main axis in all or part of the optical fiber, accessible through reconstruction. Thus, no selectivity criteria are imposed, the mitigation of the fading phenomenon is entirely based on the physical properties of the electromagnetic wave guided in the optical fiber. In addition, the reconstruction allows to choose the most favorable case for the least noisy extraction of the phase. The invention has the advantage of being less complex than systems which use optical frequency diversity to mitigate the fading effect. In addition, no selectivity criteria are applied.

A third detection is performed with a 90° hybridizer (H90) with optical homodyne IQ detection and reported in FIG. 12C. This homodyne detection is therefore purely and solely optical contrary to the invention and represents one of the techniques of the prior art as proposed in the reference.

Such a detection generates significant noise both in the amplitude profile and in the phase extraction. Thus, it is not possible to trace the information carried by the electromagnetic wave, or to reconstruct the backscattered electromagnetic vector wave. The amplitude and phase are very noisy. Indeed, the low-frequency noise is not filtered by the carrier frequency and the electrical detection. Thus, the signal has very high noise levels, to the point that no information can be extracted from it.

A method according to the invention is therefore particularly advantageous and meets the existing needs in the field of distributed fiber optic measurements.

Figure 13:
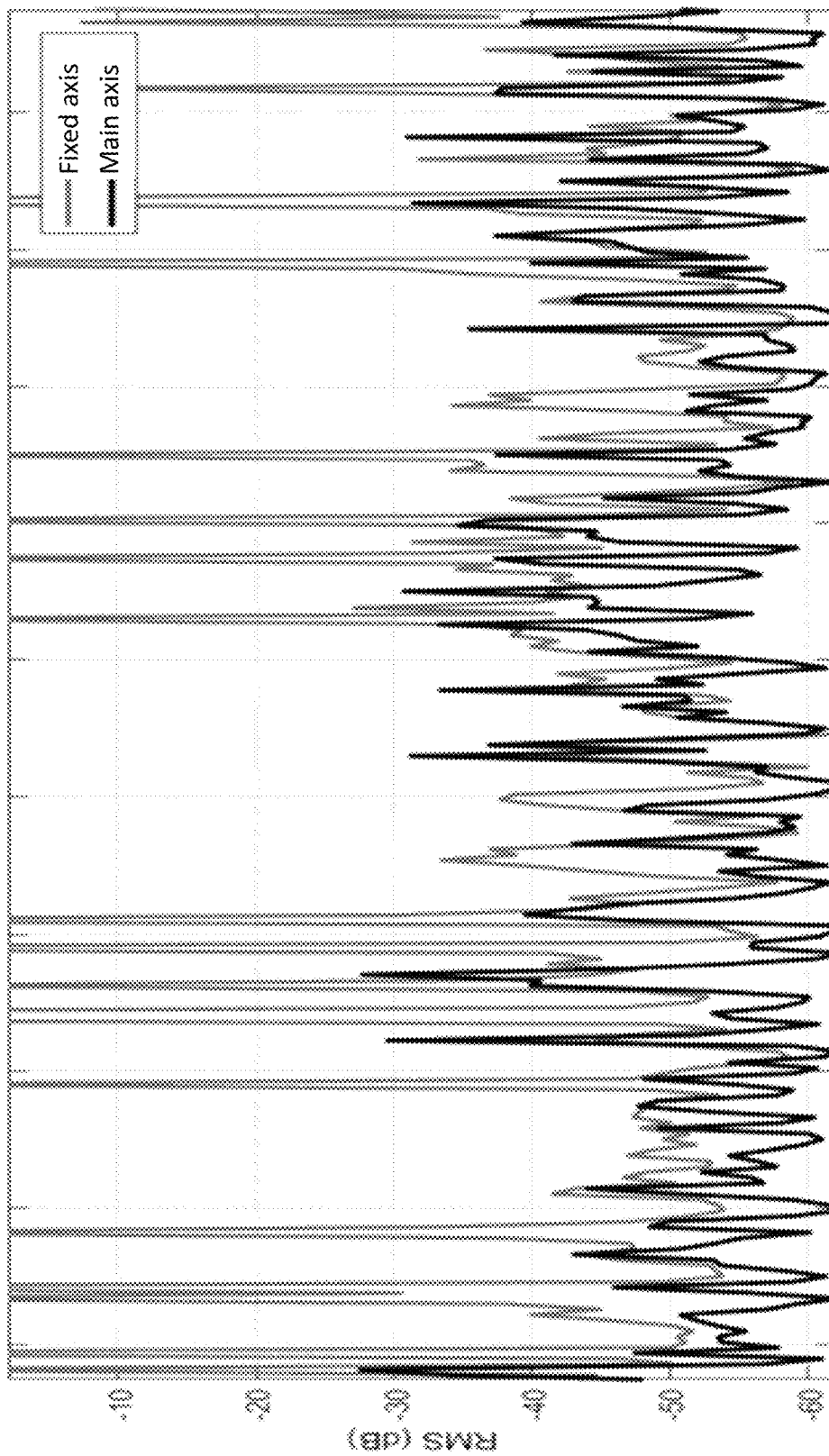
FIG. 13 shows a diagram illustrating an improvement in the quality of the signal obtained when using the main optical axis according to a method of the invention compared to the use of a fixed axis according to the prior art.

Another comparative example of an end result is shown in FIG. 13. The different measurements are obtained from a DAS.

The measurements represented by the gray curve illustrate the results of the prior art and the black curve represents the measurements obtained according to a method according to the invention.

The gray curve represents the extraction of different phases along the optical fiber to find a deformation. However, this is performed on a single polarization, on a single fixed axis. In addition, there is a lot of noise.

The black curve, illustrating the method according to the invention and including the identification of a main optical axis in all or part of the optical fiber, makes it possible to obtain results, the measurement quality of which is improved and the noise of which is minimized.

The invention claimed is:

1. A method for reconstructing an electromagnetic vector wave backscattered in all or part of an optical fiber, said method comprising:
   A step of injecting into the optical fiber a light signal of a frequency $v_0$ or $v_0+v_A$,
   A step of polarization-resolved heterodyne optical detection including generation from a backscatter of the injected light signal and an electromagnetic wave from a local oscillator, of at least two orthogonally polarized backscattered light signals, producing a beat of a frequency $v_A$,
   A step of converting, by at least two photodetectors, the orthogonally polarized backscattered light signals into initial analog signals,
   A step of electrical homodyne detection, by an IQ demodulator, for IQ demodulating each of the initial analog signals, so as to generate I ($I_1$, $I_2$) and Q ($Q_1$, $Q_2$) demodulated analog signals for each of the orthogonally polarized backscattered light signals, and
   A step of reconstructing the electromagnetic vector wave backscattered in all or part of the optical fiber from the I ($I_1$, $I_2$) and Q ($Q_1$, $Q_2$) demodulated analog signals generated.

2. The reconstruction method according to claim 1, further comprising a step of shifting a phase of a portion of the backscattered light signals, a portion of the initial analog signals or an analog reference signal at the frequency $v_A$.

3. The reconstruction method according to claim 1, wherein the electrical homodyne detection step comprises demodulating at the frequency $v_A$ by the IQ demodulator.

4. The reconstruction method according to claim 1, further comprising a step of calculating a complex amplitude (I+jQ) from the I ($I_1$, $I_2$) and Q ($Q_1$, $Q_2$) demodulated analog signals generated.

5. The reconstruction method according to claim 4, wherein the step of reconstructing the backscattered electromagnetic vector wave comprises a step of calculating a phase and/or amplitude in all or part of the optical fiber and for any projection axes in all or part of the optical fiber as a function of the complex amplitude values (I+jQ) determined from the I ($I_1$, $I_2$) and Q ($Q_1$, $Q_2$) demodulated analog signals generated.

6. The reconstruction method according to claim 1, further comprising a step of calculating phase and amplitude values from the I ($I_1$, $I_2$) and Q ($Q_1$, $Q_2$) demodulated analog signals generated.

7. The reconstruction method according to claim 6, wherein the step of reconstructing the backscattered electromagnetic vector wave comprises a step of calculating a complex amplitude in all or part of the optical fiber and for any projection axes in all or part of the optical fiber as a function of the amplitude and phase values calculated from the I ($I_1$, $I_2$) and Q ($Q_1$, $Q_2$) demodulated analog signals generated.

8. The reconstruction method according to claim 1, further comprising calculating a maximum amplitude comprising identifying an optimal angle associated with the maximum amplitude for any projection axis in all or part of the optical fiber, said optimal angle corresponding to an angle having the highest maximum amplitude among amplitudes of a plurality of angles corresponding to the projection axes in all or part of the optical fiber.

9. The reconstruction method according to claim 1, further comprising a step of detecting a parameter of interest.

10. The reconstruction method according to claim 1, further comprising a step of identifying a main optical axis of the light signal backscattered in all or part of the optical fiber from a maximum amplitude calculation.

11. The reconstruction method according to claim 1, further comprising a step of modulating the light signal by a modulator, before the step of injecting into the optical fiber, said modulation allowing a shift in the frequency of the light signal by a value equal to $v_A$.

12. The reconstruction method according to claim 11, further comprising a step of intermediate amplification of an electrical signal from the modulator at the modulation frequency $v_A$.

13. The reconstruction method according to claim 1, further comprising a step of analog filtering, making it possible to suppress frequencies of the analog signals higher than a predetermined threshold.

14. A method of optoelectronic measurement in a distributed acoustic detection system, comprising reconstructing an electromagnetic vector wave backscattered in all or part of an optical fiber according to claim 1, and measuring a deformation and/or a temperature variation in all or part of the optical fiber as a function of the reconstructed backscattered electromagnetic vector wave.

15. The optoelectronic measurement method according to claim 14, further comprising measuring a deformation and/or a temperature variation in all or part of the optical fiber on a reconstructed main optical axis.

16. A device for reconstructing an electromagnetic vector wave backscattered in all or part of an optical fiber, said device comprising:

A light source configured to generate a light signal of a frequency $v_0$, suitable for injection into the optical fiber, An optical separation means configured to generate at least two orthogonally polarized backscattered light signals, producing a beat of a frequency $v_A$, from a backscatter of the injected light signal and an electromagnetic wave from a local oscillator, At least two photodetectors, configured to convert the orthogonally polarized backscattered light signals into initial analog signals, An IQ demodulator arranged to perform an electrical homodyne detection, for IQ demodulating each of the initial analog signals so as to generate I ($I_1$, $I_2$) and Q ($Q_1$, $Q_2$) demodulated analog signals for each of the orthogonally polarized backscattered light signals, and A processing module configured to reconstruct the electromagnetic vector wave backscattered in all or part of the optical fiber from the I ($I_1$, $I_2$) and Q ($Q_1$, $Q_2$) demodulated analog signals generated.

\* \* \* \* \*